(12) United States Patent
Tsai et al.

(10) Patent No.: US 8,848,298 B2
(45) Date of Patent: Sep. 30, 2014

(54) IMAGE CAPTURING OPTICAL LENS ASSEMBLY

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/018,410

(22) Filed: Sep. 4, 2013

(65) Prior Publication Data

US 2014/0002711 A1  Jan. 2, 2014

Related U.S. Application Data

(62) Division of application No. 13/225,490, filed on Sep. 5, 2011, now Pat. No. 8,576,503.

(30) Foreign Application Priority Data

May 17, 2011  (TW) .............................. 100117256 A

(51) Int. Cl.
*G02B 13/18* (2006.01)
*G02B 9/34* (2006.01)
*G02B 13/00* (2006.01)
*G02B 27/64* (2006.01)

(52) U.S. Cl.
CPC *G02B 27/64* (2013.01); *G02B 9/34* (2013.01); *G02B 13/004* (2013.01); *G02B 13/18* (2013.01)

USPC .......................................... 359/715; 359/772

(58) Field of Classification Search
CPC ........ G02B 27/64; G02B 9/34; G02B 13/004; G02B 13/18
USPC ......................................... 359/715, 772, 775
See application file for complete search history.

(56) References Cited

U.S. PATENT DOCUMENTS

2008/0239138 A1  10/2008  Sano
2009/0128927 A1*  5/2009  Chen et al. ................. 359/715
2010/0321793 A1  12/2010  Lin

FOREIGN PATENT DOCUMENTS

| EP | 2112541 A1 | 10/2009 |
| JP | 2009-098514 A | 5/2009 |
| TW | 200842429 | 11/2008 |
| TW | 201109711 | 3/2011 |

* cited by examiner

*Primary Examiner* — William Choi
(74) *Attorney, Agent, or Firm* — CKC & Partners Co., Ltd.

(57) ABSTRACT

An image capturing optical lens assembly includes, in order from an object side to an image side, a first lens element with positive refractive power having a convex object-side surface and a concave image-side surface, a second lens element with negative refractive power, a third lens element with negative refractive power having a concave object-side surface and a convex image-side surface, and a fourth lens element with refractive power having a concave image-side surface. The object-side surface and the image-side surface of the fourth lens element are aspheric. Either or both of the object-side surface and the image-side surface have at least one inflection point formed thereon.

9 Claims, 14 Drawing Sheets

IMAGE CAPTURING OPTICAL LENS ASSEMBLY

RELATED APPLICATIONS

The present application is a Divisional application of the application Ser. No. 13/225,490, filed Sep. 5, 2011, the entire contents of which are hereby incorporated herein by reference, which claims priority to Taiwan Application Serial Number 100117256, filed May 17, 2011, all of which are herein incorporated by reference.

BACKGROUND

1. Technical Field

The present invention relates to an image capturing optical lens assembly. More particularly, the present invention relates to a compact image capturing optical lens assembly applicable to electronic products.

2. Description of Related Art

In recent years, with the popularity of mobile products with camera functionalities, the demand for compact image capturing optical lens assemblies is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact image capturing optical lens assemblies have gradually evolved toward higher megapixels, there is an increasing demand for compact image capturing optical lens assemblies featuring better image quality.

A conventional compact image capturing optical lens assembly in a portable electronic product typically utilizes a three-element lens structure. Such a conventional image capturing optical lens assembly has a first lens element with positive refractive power, a second lens element with negative refractive power and a third lens element with positive refractive power. The first, second and third lens elements are arranged in this order from an object-side to an image-side. While the three-element lens structure is compact, it is not able to produce high quality images.

Another conventional compact image capturing optical lens assembly provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated. Moreover, it is not easy to attach the glass lenses, and thus the manufacturing process for forming the glass doublet lenses is difficult.

SUMMARY

According to one aspect of the present disclosure, an image capturing optical lens assembly includes, in order from an object side to an image side, a first lens element, a second lens element, a third lens element and a fourth lens element. The first lens element has positive refractive power and has a convex object-side surface and a concave image-side surface. The second lens element has negative refractive power. The third lens element has negative refractive power and has a concave object-side surface and a convex image-side surface. The fourth lens element has refractive power and has a concave image-side surface. The object-side surface and the image-side surface of the fourth lens element are aspheric, and the fourth lens element has at least one reflection point formed on at least one of the object-side surface and the image-side surface thereof. When a focal length of the image capturing optical lens assembly is f, a focal length of the third lens element is f3, an axial distance between the first lens element and the second lens element is T12, an axial distance between the third lens element and the fourth lens element is T34, a curvature radius of the object-side surface of the second lens element is R3, and a curvature radius of the image-side surface of the second lens element is R4, the following relationships are satisfied:

$$-1.5 < f/f3 < -0.2;$$

$$0 < T34/T12 < 2.1; \text{ and}$$

$$(R3+R4)/(R3-R4) < 1.0.$$

According to another aspect of the present disclosure, an image capturing optical lens assembly includes, in order from an object side to an image side, a first lens element, a second lens element, a third lens element and a fourth lens element. The first lens element has positive refractive power and has a convex object-side surface and a concave image-side surface. The second lens element has negative refractive power. The third lens element has negative refractive power and has a concave object-side surface and a convex image-side surface. The fourth lens element has refractive power and has a convex object-side surface and a concave image-side surface. The object-side surface and the image-side surface of the fourth lens element are aspheric, and the fourth lens element has at least one reflection point formed on at least one of the object-side surface and the image-side surface thereof. When a focal length of the image capturing optical lens assembly is f, a focal length of the third lens element is f3, an axial distance between the first lens element and the second lens element is T12, an axial distance between the third lens element and the fourth lens element is T34, the Abbe number of the second lens element is V2, and the Abbe number of the third lens element is V3, the following relationships are satisfied:

$$-1.2 < f/f3 < -0.3;$$

$$0 < T34/T12 < 2.1; \text{ and}$$

$$23 < V3 - V2 < 42.$$

DETAILED DESCRIPTION

Figure 1:
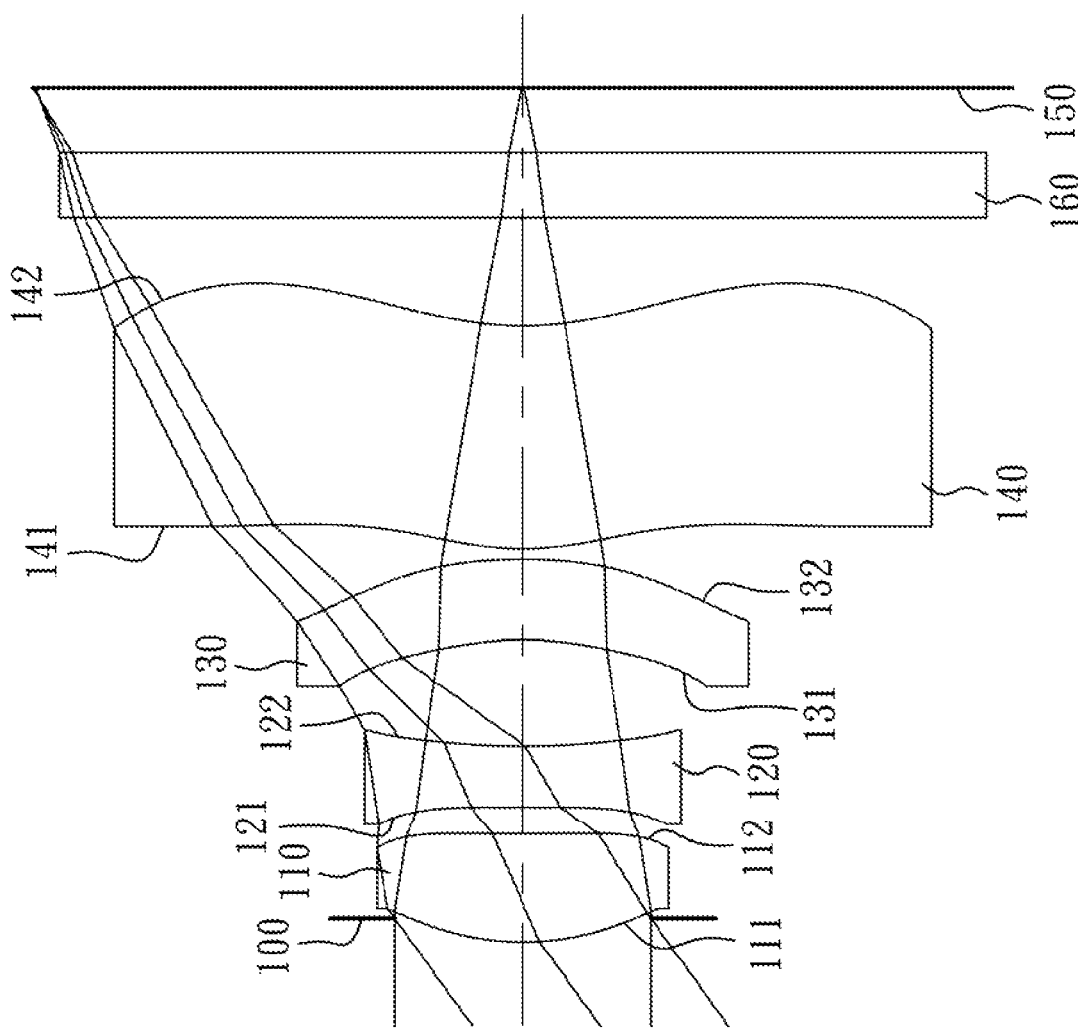
FIG. 1 is a schematic view of an image capturing optical lens assembly according to the first embodiment of the present disclosure.

An image capturing optical lens assembly includes, in order from an object side to an image side, a first lens element, a second lens element, a third lens element and a fourth lens element. The image capturing optical lens assembly further includes an image sensor located on an image plane.

The first lens element with positive refractive power provides partial refractive power for reducing the total track length of the image capturing optical lens assembly so as to maintain the compact size of the image capturing optical lens assembly. The first lens element has a convex object-side surface and a concave image-side surface, so that the astigmatism of the image capturing optical lens assembly can be corrected.

The second lens element with negative refractive power can correct the aberration generated from the first lens element and can further correct the chromatic aberration of the image capturing optical lens assembly.

The third lens element with negative refractive power can provide a distribution of the refractive power of the image capturing optical lens assembly, so that the error sensitivity of the image capturing optical lens assembly can be reduced, and the manufacture of the image capturing optical lens assembly is more easily realized. The third lens element has a concave object-side surface and a convex image-side surface, such as a meniscus, so that the astigmatism of the image capturing optical lens assembly can be corrected.

The fourth lens element can have positive refractive power or negative refractive power. When the fourth lens element has positive refractive power, the high-order aberration of the image capturing optical lens assembly can be corrected so as to enhance the resolution of the images thereof. When the fourth lens element has negative refractive power and has a concave image-side surface, the principal point of the image capturing optical lens assembly can be positioned away from the image plane so as to reduce the back focal length thereof. Therefore, the total track length of the image capturing optical lens assembly can be reduced while maintaining the compact size thereof. Moreover, when the fourth lens element has at least one reflection point formed on at least one of the object-side surface and the image-side surface thereof, the incident angle of the off-axis field of light on the image sensor can be effectively minimized and the aberration of the off-axis field can be corrected.

When a focal length of the image capturing optical lens assembly is f, and a focal length of the third lens element is f3, the following relationship is satisfied:

$$-1.5 < f/f3 < -0.2.$$

Therefore, the refractive power of the third lens element can correct the aberration of the image capturing optical lens assembly and reduce the photosensitivity thereof.

f and f3 can further satisfy the following relationship:

$$-1.0 < f/f3 < -0.5.$$

Furthermore, f and f3 can satisfy the following relationship:

$$-1.2 < f/f3 < -0.3.$$

When an axial distance between the first lens element and the second lens element is T12, and an axial distance between the third lens element and the fourth lens element is T34, the following relationship is satisfied:

$$0 < T34/T12 < 2.1.$$

Therefore, the fabrication of the lens elements is more easily realized. Furthermore, the total track length of the image capturing optical lens assembly can be reduced.

T12 and T34 can further satisfy the following relationship:

$$0 < T34/T12 < 1.0.$$

When a curvature radius of the object-side surface of the second lens element is R3, and a curvature radius of the image-side surface of the second lens element is R4, the following relationship is satisfied:

$$(R3+R4)/(R3-R4) < 1.0.$$

Therefore, the shape of the surfaces of the second lens element can maintain the refractive power thereof, so that the aberration generated from the first lens element can be corrected. Moreover, the negative refractive power of the third lens element can reduce the sensitivity of the error of the image capturing optical lens assembly, so that manufacture can be more easily realized.

When the Abbe number of the second lens element is V2, and the Abbe number of the third lens element is V3, the following relationship is satisfied:

$$23 < V3-V2 < 42.$$

Therefore, the chromatic aberration of the mage capturing optical lens assembly can be corrected.

When a curvature radius of the object-side surface of the third lens element is R5, and a curvature radius of the image-side surface of the third lens element is R6, the following relationship is satisfied:

$$-0.5 < (R5-R6)/(R5+R6) < -0.2.$$

When the above relation is satisfied, the shape of the surfaces of the third lens element can correct the astigmatism. At the same time, the sensitivity of the manufacturing error of the image capturing optical lens assembly can be reduced.

When a focal length of the second lens element is f2, and the focal length of the third lens element is f3, the following relationship is satisfied:

$$0.7 < f2/f3 < 1.3.$$

Therefore the refractive power of the second lens element and the third lens element can reduce the sensitivity of the manufacturing error of the image capturing optical lens assembly.

When the Abbe number of the first lens element is V1, and the Abbe number of the second lens element is V2, the following relationship is satisfied:

$$30 < V1-V2 < 45.$$

Therefore, the chromatic aberration of the image capturing optical lens assembly can be further corrected.

When a central thickness of the third lens element is CT3 and a central thickness of the fourth lens element is CT4, the following relationship is satisfied:

$$0.25 < CT3/CT4 < 0.6.$$

Therefore, the thickness of the third lens element and the fourth lens element can reduce the total track length of the image capturing optical lens assembly.

When a half of a diagonal length of an effective photosensitive area of the mage sensor is ImgH, and the axial distance between the object-side surface of the first lens element and the image plane is TTL, the following relationship is satisfied:

$$TTL/ImgH < 2.0.$$

Therefore, the total track length of the image capturing optical lens assembly can be reduced, so as to maintain the compact size of the optical image system. As a result, the image capturing optical lens assembly may be applied to lightweight and portable electronic products.

According to the image capturing optical lens assembly of the present disclosure, when the lens element has a convex surface, this indicates that the paraxial region of the surface is convex, and when the lens element has a concave surface, this indicates that the paraxial region of the surface is concave.

According to the image capturing optical lens assembly of the present disclosure the lens element can be made of glass material or plastic material. When the lens element is made of glass material, there is a higher degree of freedom in design parameters of the image capturing optical lens assembly. When the lens element is made of plastic material, the cost of manufacture can be effectively reduced. Moreover, the surface of the lens element can be aspheric, so that it is easier to make the surface into other non-spherical shapes. As a result, more controllable variables are obtained the aberration is reduced and the number of required lens elements is reduced. Therefore, the total track length of the image capturing optical lens assembly can be reduced.

According to the image capturing optical lens assembly of the present disclosure, the image capturing optical lens assembly can include at least one stop for reducing stray light while retaining high image quality. Furthermore, when the stop is an aperture stop, the position of the aperture stop within an optical system can be arbitrarily placed in front of the entire optical system or within the optical system depending on the preference of the designer of the optical system, in order to achieve the desirable optical features or higher image quality produced from the optical system.

According to the above description of the present invention, the following 1st-7th specific embodiments are provided for further explanation.

Figure 2:
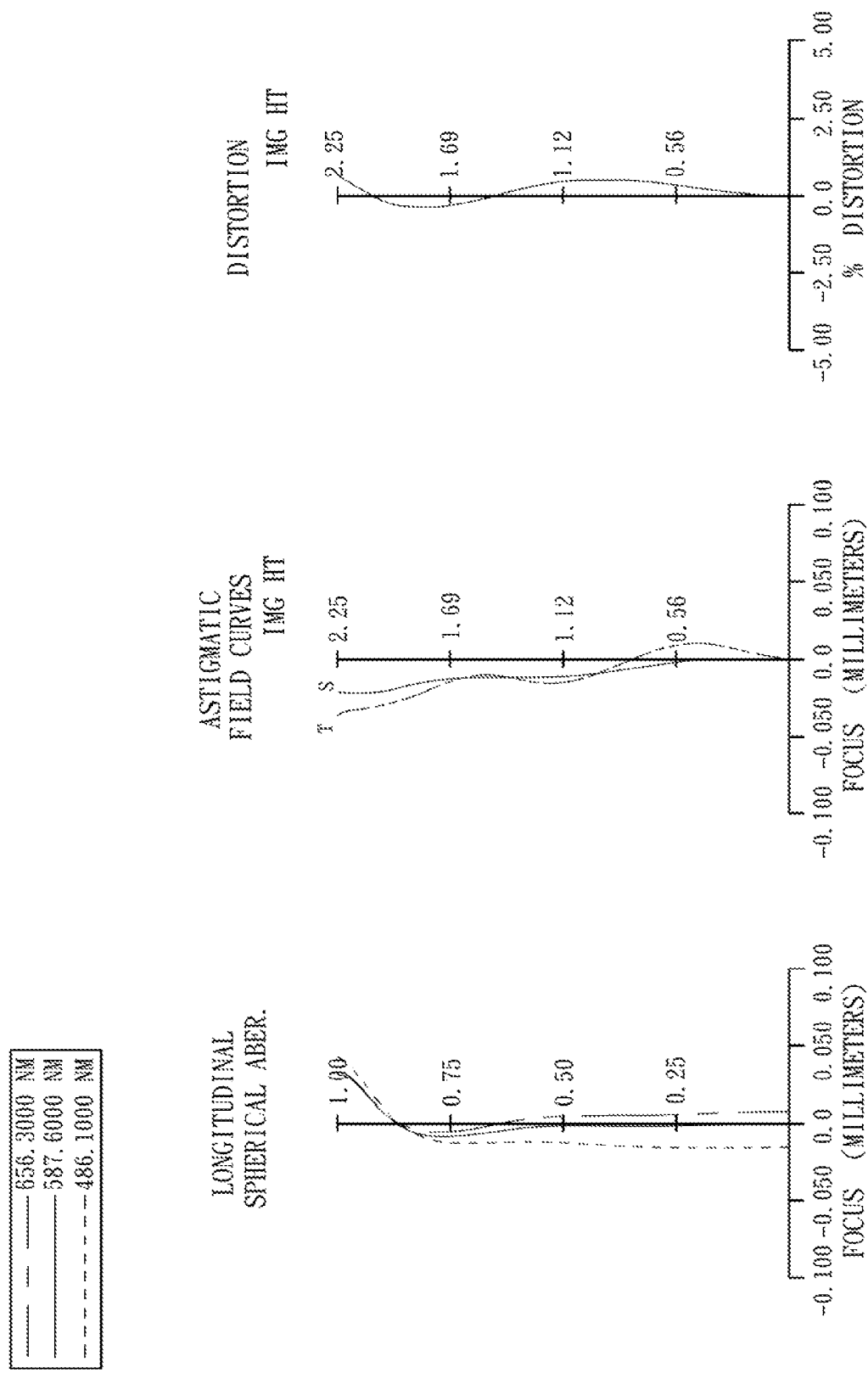
FIG. 2 shows spherical aberration curves, astigmatic field curves and a distortion curve of the image capturing optical lens assembly according to the first embodiment.

FIG. 1 is a schematic view of an image capturing optical lens assembly according to the first embodiment of the present disclosure. FIG. 2 shows spherical aberration curves, astigmatic field curves and a distortion curve of the image capturing optical lens assembly according to the first embodiment. In FIG. 1, the image capturing optical lens assembly includes, in order from an object side to an image side, an aperture stop 100, the first lens element 110, the second lens element 120, the third lens element 130, the fourth lens element 140, an IR (infrared) cut filter 160 and an image plane 150.

The first lens element 110 is made of plastic material. The first lens element 110 has positive refractive power and has a convex object-side surface 111 and a concave image-side surface 112. The object-side surface 111 and the image-side surface 112 of the first lens element 110 are aspheric.

The second lens element 120 is made of plastic material. The second lens element 120 has negative refractive power and has a concave object-side surface 121 and a concave image-side surface 122. The object-side surface 121 and the image-side surface 122 of the second lens element 120 are aspheric.

The third lens element 130 is made of plastic material. The third lens element 130 has negative refractive power and has a concave object-side surface 131 and a convex image-side surface 132. The object-side surface 131 and the image-side surface 132 of the third lens element 130 are aspheric.

The fourth lens element 140 is made of plastic material. The fourth lens element 140 has positive refractive power and has a convex object-side surface 141 and a concave image-side surface 142. The object-side surface 141 and the image-side surface 142 of the fourth lens element 140 are aspheric. The fourth lens element 140 has inflection points formed on the object-side surface 141 and the image-side surface 142 thereof.

The IR cut filter 160 is made of glass and located between the fourth lens element 140 and the image plane 150, and will not affect the focal length of the image capturing optical lens assembly.

The equation of the aspheric surface profiles of the aforementioned lens elements of the first embodiment is expressed as follows:

$$X(Y) = (Y^2/R)/(1+\text{sqrt}(1-(1+k)\times(Y/R)^2)) + \Sigma(Ai)\times(Y^i)$$

where:

X is the height of a point on the aspheric surface spaced at a distance Y from the optical axis relative to the tangential plane at the aspheric surface vertex;

Y is the distance from the point on the curve of the aspheric surface to the optical axis;

R is the curvature radius of the surface of the lens element;

k is the conic coefficient; and

Ai is the i-th aspheric coefficient.

In the image capturing optical lens assembly according to the first embodiment, when f is a focal length of the image capturing optical lens assembly, Fno is an f-number of the image capturing optical lens assembly, and HFOV is half of the maximal field of view, these parameters have the following values:

f=3.13 mm;

Fno=2.65; and

HFOV=35.6 degrees.

In the image capturing optical lens assembly according to the first embodiment, when the Abbe number of the first lens element 110 is V1, the Abbe number of the second lens element 120 is V2, and the Abbe number of the third lens element 130 is V3, the following relationships are satisfied:

$$V1-V2 = 32.1; \text{ and}$$

$$V3-V2 = 32.1.$$

In the image capturing optical lens assembly according to the first embodiment, when a central thickness of the third lens element 130 is CT3, and a central thickness of the fourth lens element 140 is CT4, the following relationship is satisfied:

$CT3/CT4=0.36$.

In the image capturing optical lens assembly according to the first embodiment, when an axial distance between the first lens element 110 and the second lens element 120 is T12, and an axial distance between the third lens element 130 and the fourth lens element 140 is T34, the following relationship is satisfied:

$T34/T12=0.41$.

In the image capturing optical lens assembly according to the first embodiment, when a curvature radius of the object-side surface 121 of the second lens element 120 is R3, a curvature radius of the image-side surface 122 of the second lens element 120 is R4, a curvature radius of the object-side surface 131 of the third lens element 130 is R5, and a curvature radius of the image-side surface 132 of the third lens element 130 is R6, the following relationships are satisfied:

$(R3+R4)/(R3-R4)=0.33$; and $(R5-R6)/(R5+R6)=-0.30$.

In the image capturing optical lens assembly according to the first embodiment, when the focal length of the image capturing optical lens assembly is f, a focal length of the second lens element 120 is f2, and a focal length of the third lens element 130 is f3, the following relationships are satisfied:

$f2/f3=0.90$; and $f/f3=-0.52$,

In the image capturing optical lens assembly according to the first embodiment, when a half of a diagonal length of an effective photosensitive area of the image sensor is Imgh, and the axial distance between the object-side surface 111 of the first lens element 110 and the image plane 150 is TTL, the following relationship is satisfied:

$TTL/ImgH=1.70$.

The detailed optical data of the first embodiment are shown in Table 1 and the aspheric surface data are shown in Table 2 below.

TABLE 1

1st Embodiment
f = 3.13 mm, Fno = 2.65, HFOV = 35.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.109 | | | | |
| 2 | Lens 1 | 1.273680 (ASP) | 0.498 | Plastic | 1.544 | 55.9 | 2.52 |
| 3 | | 15.576300 (ASP) | 0.123 | | | | |
| 4 | Lens 2 | −42.087500 (ASP) | 0.279 | Plastic | 1.634 | 23.8 | −5.46 |
| 5 | | 3.784800 (ASP) | 0.492 | | | | |
| 6 | Lens 3 | −1.354950 (ASP) | 0.370 | Plastic | 1.544 | 55.9 | −6.06 |
| 7 | | −2.521010 (ASP) | 0.050 | | | | |
| 8 | Lens 4 | 1.119560 (ASP) | 1.027 | Plastic | 1.530 | 55.8 | 4.30 |
| 9 | | 1.501260 (ASP) | 0.500 | | | | |
| 10 | IR-filter | Plano | 0.300 | Glass | 1.517 | 64.2 | — |
| 11 | | Plano | 0.297 | | | | |
| 12 | Image | Plano | — | | | | |

Note:
Reference wavelength (d-line) is 587.6 nm.

TABLE 2

Aspheric Coefficients

| | Surface # | | | |
|---|---|---|---|---|
| | 2 | 3 | 4 | 5 |
| K = | −8.02101E−01 | −1.00000E+00 | −1.00000E+00 | 3.24301E+00 |
| A4 = | 5.86953E−02 | −9.91439E−02 | −1.42409E−01 | 7.62741E−02 |
| A6 = | −1.46725E−01 | −8.99089E−01 | −1.13682E+00 | −6.44947E−01 |
| A8 = | 6.88119E−01 | 1.54539E+00 | 1.97931E+00 | 1.39383E+00 |
| A10 = | −1.61679E+00 | −2.17680E+00 | −1.44628E+00 | −9.75374E−01 |
| A12 = | −1.99874E−09 | 3.30950E−10 | −1.16482E−09 | 4.15705E−01 |

| | Surface # | | | |
|---|---|---|---|---|
| | 6 | 7 | 8 | 9 |
| K = | −2.00000E+01 | 3.36744E+00 | −9.81807E+00 | −1.84258E+00 |
| A4 = | −6.09553E−02 | −2.75154E−01 | −2.27378E−01 | −1.87621E−01 |
| A6 = | −6.24716E−02 | 4.42943E−01 | 1.43656E−01 | 8.22161E−02 |
| A8 = | −3.83171E−02 | −2.82523E−01 | −3.85637E−02 | −2.74343E−02 |
| A10 = | 5.22450E−03 | 8.58157E−02 | 3.66873E−03 | 5.27017E−03 |
| A12 = | −1.19973E−01 | 1.26670E−02 | | −4.38663E−04 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A12 represent the aspheric coefficients ranging from the 1st order to the 12th order. This information related to Table 1 and Table 2 applies also to the Tables for the remaining embodiments, and so an explanation in this regard will not be provided again.

Figure 3:
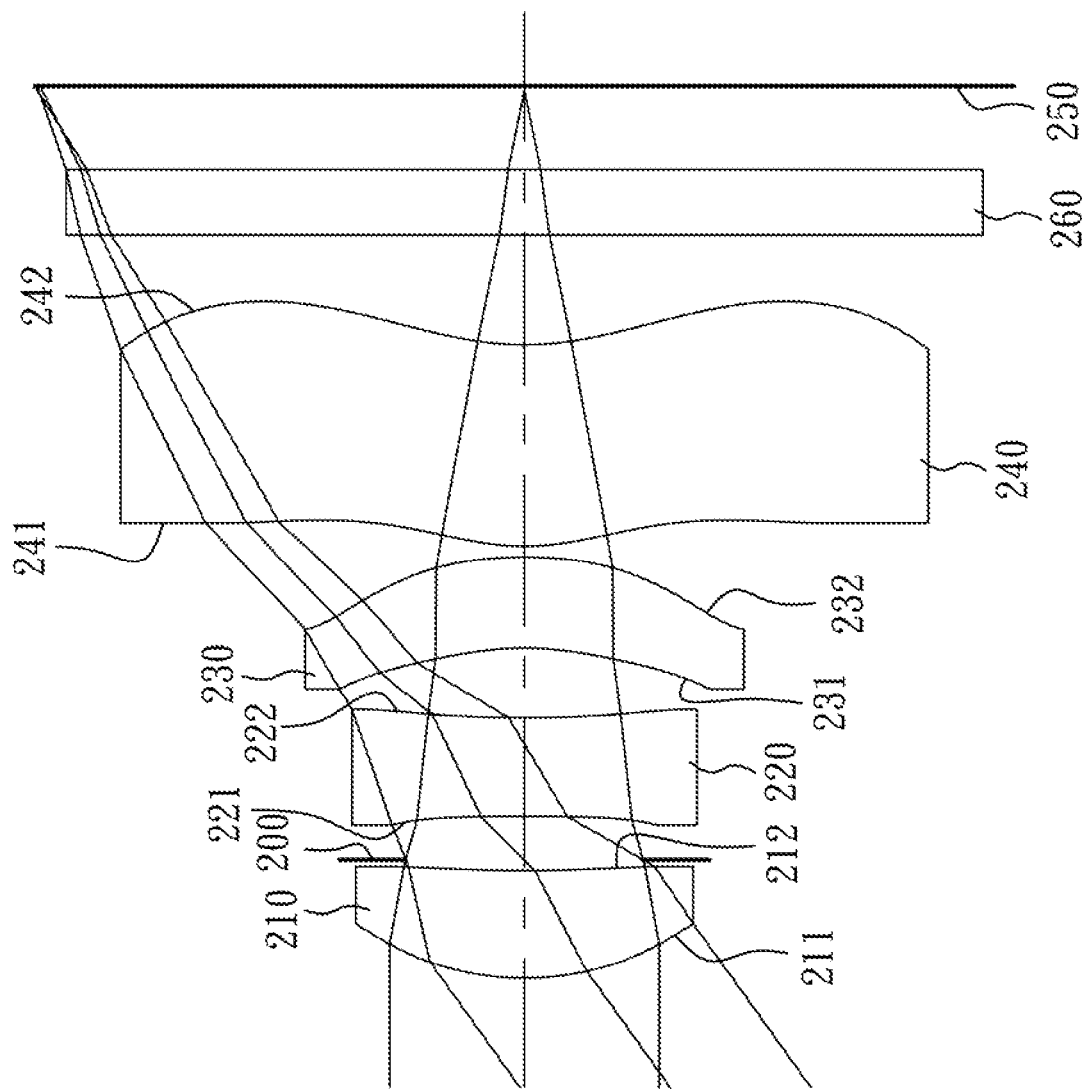
FIG. 3 is a schematic view of an image capturing optical lens assembly according to the second embodiment of the present disclosure.
Figure 4:
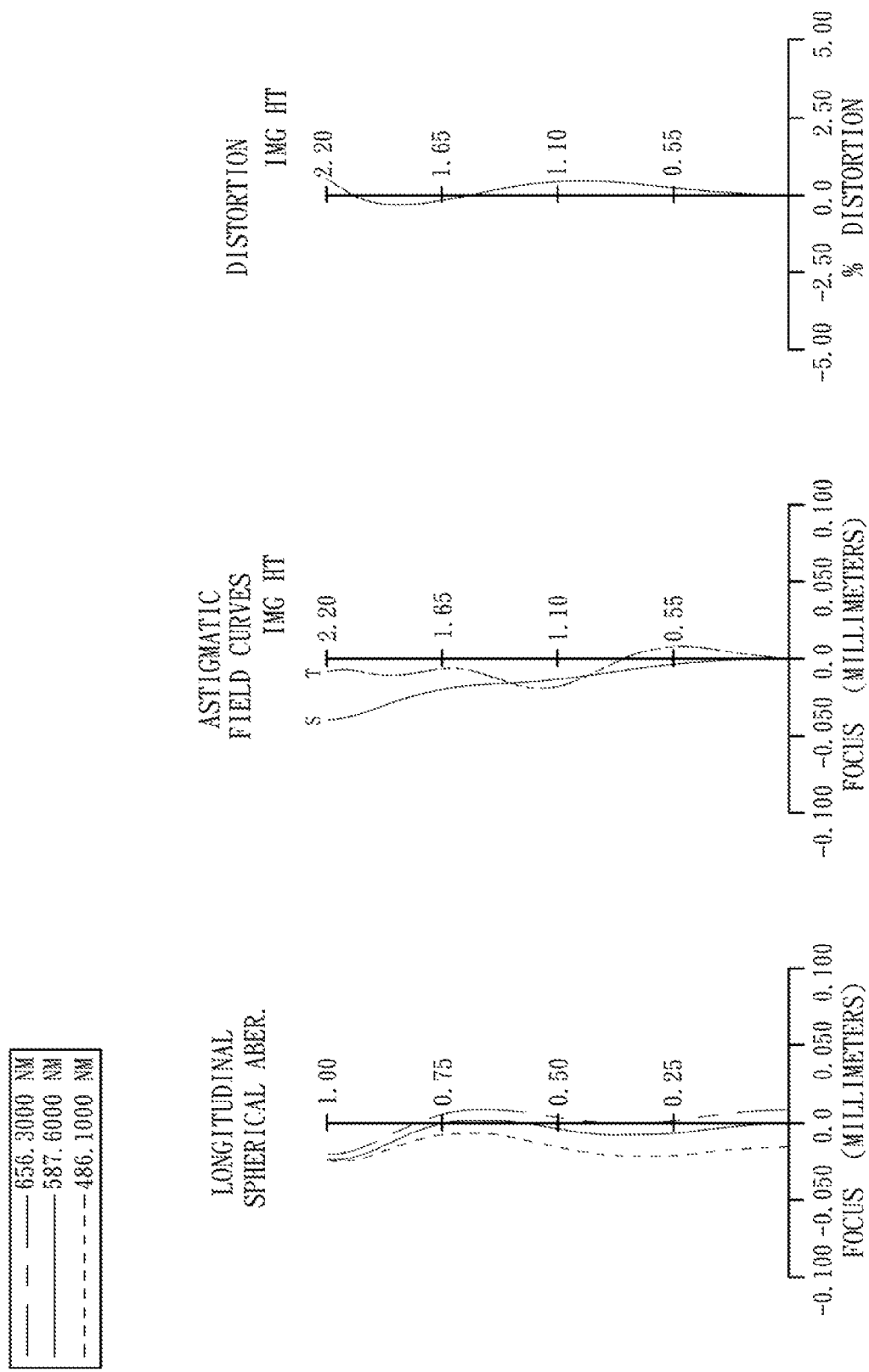
FIG. 4 shows spherical aberration curves, astigmatic field curves and a distortion curve of the image capturing optical lens assembly according to the second embodiment.

FIG. 3 is a schematic view of an image capturing optical lens assembly according to the second embodiment of the present disclosure. FIG. 4 shows spherical aberration curves, astigmatic field curves and a distortion curve of the image capturing optical lens assembly according to the second embodiment. In FIG. 3, the image capturing optical lens assembly includes, in order from an object side to an image side, the first lens element 210, an aperture stop 200, the second lens element 220, the third lens element 230, the fourth lens element 240, an IR (infrared) cut filter 260 and an image plane 250.

The first lens element 210 is made of plastic material. The first lens element 210 has positive refractive power and has a convex object-side surface 211 and a concave image-side surface 212. The object-side surface 211 and the image-side surface 212 of the first lens element 210 are aspheric.

The second lens element 220 is made of plastic material. The second lens element 220 has negative refractive power and has a concave object-side surface 221 and a concave image-side surface 222. The object-side surface 221 and the image-side surface 222 of the second lens element 220 are aspheric.

The third lens element 230 is made of plastic material. The third lens element 230 has negative refractive power and has a concave object-side surface 231 and a convex image-side surface 232. The object-side surface 231 and the image-side surface 232 of the third lens element 230 are aspheric.

The fourth lens element 240 is made of plastic material. The fourth lens element 240 has positive refractive power and has a convex object-side surface 241 and a concave image-side surface 242. The object-side surface 241 and the image-side surface 242 of the fourth lens element 240 are aspheric. The fourth lens element 240 has inflection points formed on the object-side surface 241 and the image-side surface 242 thereof.

The IR cut filter 260 is made of glass and located between the fourth lens element 240 and the image plane 250, and will not affect the focal length of the image capturing optical lens assembly.

The equation of the aspheric surface profiles of the above lens elements of the second embodiment is the same as that of the first embodiment, and will not be stated herein again.

In the image capturing optical lens assembly according to the second embodiment the definitions of f, Fno, HFOV, V1, V2, V3, CT3, CT4, T12, T34, R3, R4, R5, R6, f2, f3, ImgH and TTL are the same as those stated in the first embodiment with corresponding values for the second embodiment. Moreover, these parameters have the following values and satisfy the following relationships:

| f (mm) | 3.06 | T34/T12 | 0.20 |
| Fno | 2.50 | (R3 + R4)/(R3 − R4) | 0.26 |
| HFOV (deg.) | 35.6 | (R5 − R6)/(R5 + R6) | −0.22 |
| V1-V2 | 34.9 | f2/f3 | 0.82 |
| V3-V2 | 34.9 | f/f3 | −0.38 |
| CT3/CT4 | 0.45 | TTL/ImgH | 1.80 |

The detailed optical data of the second embodiment are shown in Table 3 and the aspheric surface data are shown in Table 4 below.

TABLE 3

2nd Embodiment f = 3.06 mm, Fno = 2.50, HFOV = 35.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.315880 (ASP) | 0.488 | Plastic | 1.535 | 56.3 | 2.91 |
| 2 | | 7.447100 (ASP) | 0.048 | | | | |
| 3 | Ape. Stop | Plano | 0.202 | | | | |
| 4 | Lens 2 | −11.850200 (ASP) | 0.446 | Plastic | 1.650 | 21.4 | −6.71 |
| 5 | | 6.997100 (ASP) | 0.319 | | | | |
| 6 | Lens 3 | −1.246240 (ASP) | 0.412 | Plastic | 1.535 | 56.3 | −8.17 |
| 7 | | −1.944390 (ASP) | 0.050 | | | | |
| 8 | Lens 4 | 1.034940 (ASP) | 0.914 | Plastic | 1.535 | 56.3 | 4.15 |
| 9 | | 1.342730 (ASP) | 0.500 | | | | |
| 10 | IR-filter | Plano | 0.300 | Glass | 1.517 | 64.2 | — |
| 11 | | Plano | 0.376 | | | | |
| 12 | Image | Plano | — | | | | |

Note:

Reference wavelength (d-line) is 587.6 nm.

TABLE 4

Aspheric Coefficients

| | Surface # | | | |
|---|---|---|---|---|
| | 1 | 2 | 4 | 5 |
| k = | −6.55534E−01 | −1.00000E+00 | −2.44320E+02 | 5.00000E+00 |
| A4 = | 7.30994E−02 | 2.81554E−02 | −6.90800E−02 | 1.55699E−01 |
| A6 = | −1.06143E−01 | −2.66434E−01 | −5.56765E−01 | −5.62083E−01 |
| A8 = | 5.13352E−01 | 4.46270E−01 | 1.11930E+00 | 9.05773E−01 |
| A10 = | −6.54489E−01 | −8.65305E−01 | −1.76086E+00 | −1.00430E+00 |
| A12 = | −1.20291E−03 | −1.66703E−06 | −1.69531E−06 | 4.16787E−01 |

| | Surface # | | | |
|---|---|---|---|---|
| | 6 | 7 | 8 | 9 |
| k = | −2.00063E+01 | 2.20896E+00 | −8.52872E+00 | −3.32590E+00 |
| A4 = | −7.36823E−02 | −3.32411E−01 | −2.47385E−01 | −1.66130E−01 |
| A6 = | −2.94532E−02 | 4.77544E−01 | 1.45925E−01 | 7.89604E−02 |
| A8 = | 4.92176E−02 | −2.87099E−01 | −3.55169E−02 | −2.87426E−02 |
| A10 = | −2.53719E−03 | 1.18561E−01 | 3.13599E−03 | 5.74183E−03 |
| A12 = | −1.14142E−01 | 6.33689E−02 | | −4.80494E−04 |

Figure 5:
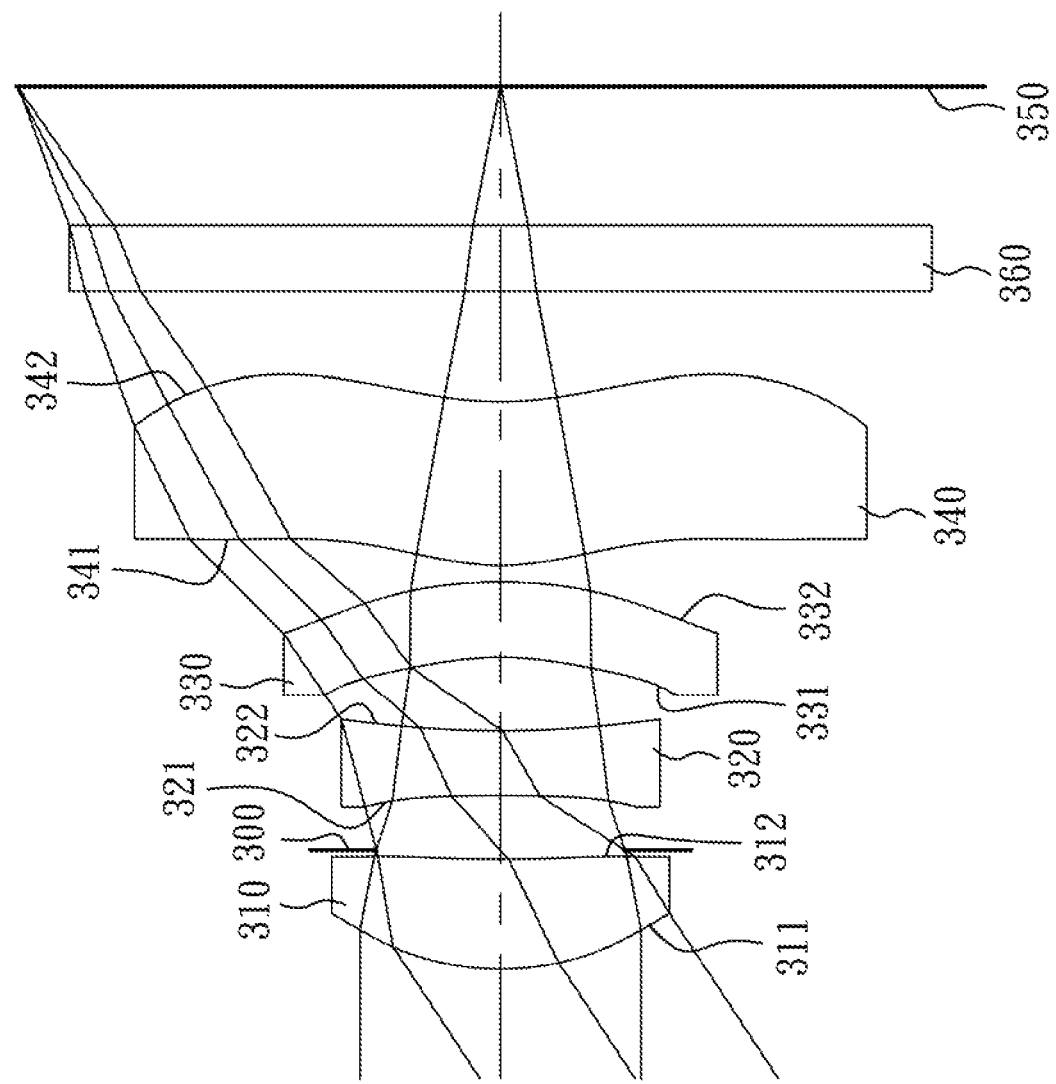
FIG. 5 is a schematic view of an image capturing optical lens assembly according to the third embodiment of the present disclosure.
Figure 6:
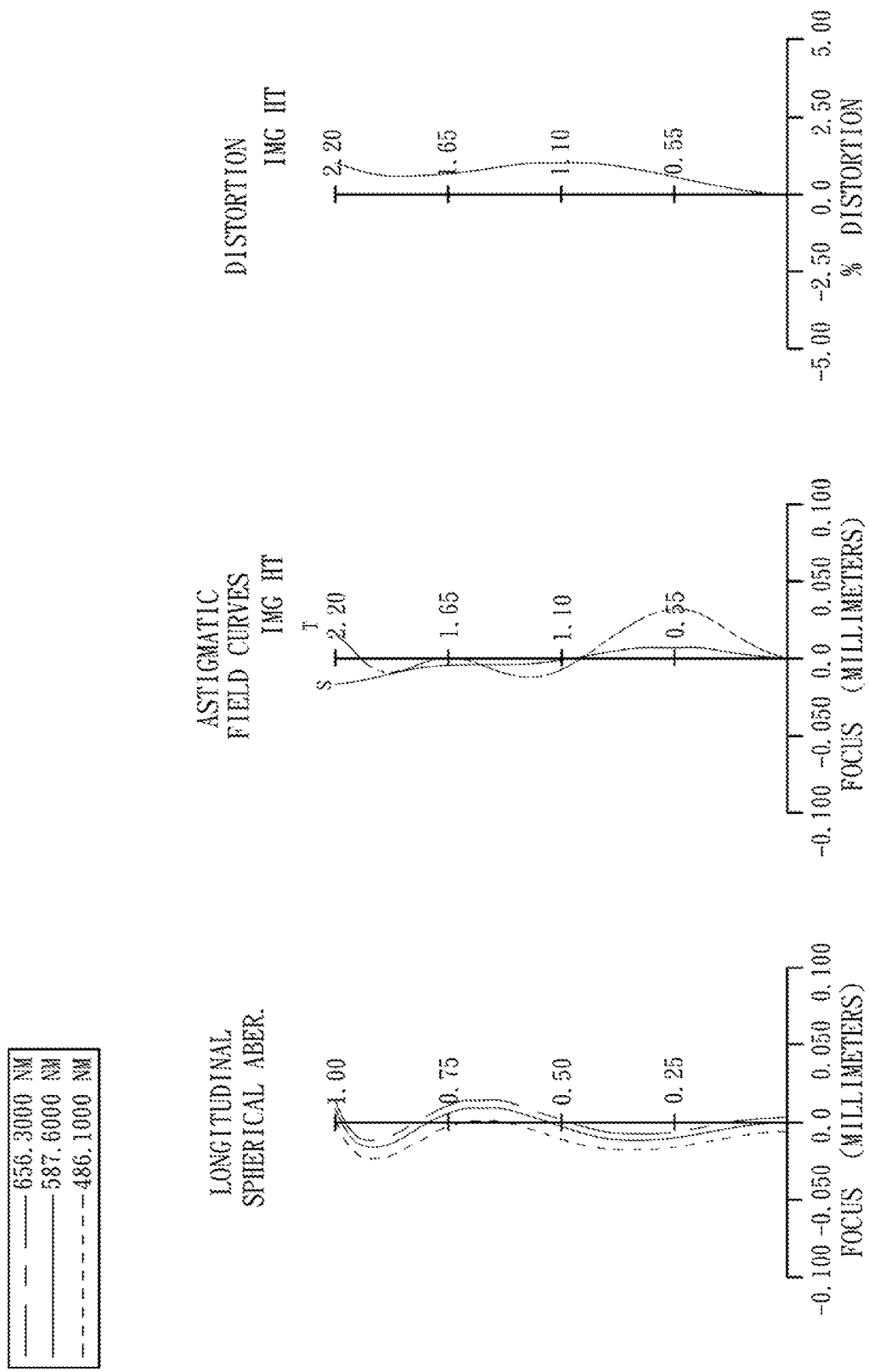
FIG. 6 shows spherical aberration curves, astigmatic field curves and a distortion curve of the image capturing optical lens assembly according to the third embodiment.

FIG. 5 is a schematic view of an image capturing, optical lens assembly according to the third embodiment of the present disclosure. FIG. 6 shows spherical aberration curves, astigmatic field curves and a distortion curve of the image capturing optical lens assembly according to the third embodiment. In FIG. 5, the image capturing optical lens assembly includes, in order from an object side to an image side, the first lens element 310 an aperture stop 300, the second lens element 320, the third lens element 330, the fourth lens element 340, an IR (infrared) cut filter 360 and an image plane 350.

The first lens element 310 is made of plastic material. The first lens element 310 has positive refractive power and has a convex object-side surface 311 and a concave image-side surface 312. The object-side surface 311 and the image-side surface 312 of the first lens element 310 are aspheric.

The second lens element 320 is made of plastic material. The second lens element 320 has negative refractive power and has a concave object-side surface 321 and a concave image-side surface 322. The object-side surface 321 and the image-side surface 322 of the second lens element 320 are aspheric.

The third lens element 330 is made of plastic material. The third lens element 330 has negative refractive power and has a concave object-side surface 331 and a convex image-side surface 332. The object-side surface 331 and a convex image-side surface 332 of the third lens element 330 are aspheric.

The fourth lens element 340 is made of plastic material. The fourth lens element 340 has positive refractive power and has a convex object-side surface 341 and a concave image-side surface 342. The object-side surface 341 and the image-side surface 342 of the fourth lens element 340 are aspheric. The fourth lens element 340 has inflection points formed on the object-side surface 341 and the image-side surface 342 thereof.

The IR cut filter 360 is made of glass and located between the fourth lens element 340 and the image plane 350, and will not affect the focal length of the image capturing optical lens assembly.

The equation of the aspheric surface profiles of the above lens elements of the third embodiment is the same as that of the first embodiment, and will not be stated herein again.

In the image capturing optical lens assembly according to the third embodiment the definitions of f, Fno, HFOV, V1, V2, V3, CT3, CT4, T12, T34, R3, R4, R5, R6, f2, f3, ImgH and TTL are the same as those stated in the first embodiment with corresponding values for the third embodiment. Moreover, these parameters have the following values and satisfy the following relationships:

| f (mm) | 3.32 | T34/T12 | 0.26 |
| Fno | 2.60 | (R3 + R4)/(R3 − R4) | 0.23 |
| HFOV (deg.) | 33.3 | (R5 − R6)/(R5 + R6) | −0.28 |
| V1-V2 | 32.5 | f2/f3 | 0.95 |
| V3-V2 | 0.0 | f/f3 | −0.61 |
| CT3/CT4 | 0.46 | TTL/ImgH | 1.78 |

The detailed optical data of the third embodiment are shown in Table 5 and the aspheric surface data are shown in Table 6 below.

TABLE 5

3rd Embodiment
f = 3.32 mm, Fno = 2.60, HFOV = 33.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.224110 (ASP) | 0.499 | Plastic | 1.535 | 56.3 | 2.67 |
| 2 | | 7.447100 (ASP) | 0.041 | | | | |
| 3 | Ape. Stop | Plano | 0.251 | | | | |
| 4 | Lens 2 | −8.594200 (ASP) | 0.292 | Plastic | 1.634 | 23.8 | −5.21 |
| 5 | | 5.432600 (ASP) | 0.337 | | | | |
| 6 | Lens 3 | −1.301780 (ASP) | 0.340 | Plastic | 1.634 | 23.8 | −5.47 |

TABLE 5-continued

3rd Embodiment
f = 3.32 mm, Fno = 2.60, HFOV = 33.3 deg.

| Surface # | | Curvature Radius | Thickness | Material | Index | Abbe # | Focal length |
|---|---|---|---|---|---|---|---|
| 7 | | −2.295550 (ASP) | 0.075 | | | | |
| 8 | Lens 4 | 1.015290 (ASP) | 0.747 | Plastic | 1.535 | 56.3 | 3.65 |
| 9 | | 1.575350 (ASP) | 0.500 | | | | |
| 10 | IR-filter | Plano | 0.300 | Glass | 1.517 | 64.2 | — |
| 11 | | Plano | 0.630 | | | | |
| 12 | Image | Plano | — | | | | |

Note:
Reference wavelength (d-line) is 587.6 nm.

TABLE 6

Aspheric Coefficients

| Surface # | | | | |
|---|---|---|---|---|
| | 1 | 2 | 4 | 5 |
| K = | −7.16264E−01 | −1.00000E+00 | −1.09884E+02 | 5.00000E+00 |
| A4 = | 7.28466E−02 | −3.36086E−02 | −7.32347E−02 | 1.63256E−01 |
| A6 = | −1.55769E−01 | −5.08219E−02 | −7.50199E−01 | −6.47555E−01 |
| A8 = | 6.21720E−01 | −5.13164E−01 | 1.33756E+00 | 8.81400E−01 |
| A10 = | −8.63411E−01 | 4.44357E−01 | −1.05866E+00 | −6.00338E−01 |
| A12 = | −1.19681E−03 | −9.86714E−07 | −1.01429E−06 | 4.16787E−01 |

| Surface # | | | | |
|---|---|---|---|---|
| | 6 | 7 | 8 | 9 |
| K = | −1.89192E+01 | 2.81670E+00 | −8.84601E+00 | −4.62311E+00 |
| A4 = | −2.47703E−02 | −2.05671E−01 | −2.38339E−01 | −1.82868E−01 |
| A6 = | −2.92997E−02 | 4.70564E−01 | 1.44734E−01 | 8.21792E−02 |
| A8 = | 2.01168E−02 | −3.22910E−01 | −3.66110E−02 | −2.95570E−02 |
| A10 = | −2.25189E−01 | 8.04884E−02 | 3.49936E−03 | 5.84724E−03 |
| A12 = | −1.14142E−01 | 2.37546E−02 | | −4.64142E−04 |

Figure 7:
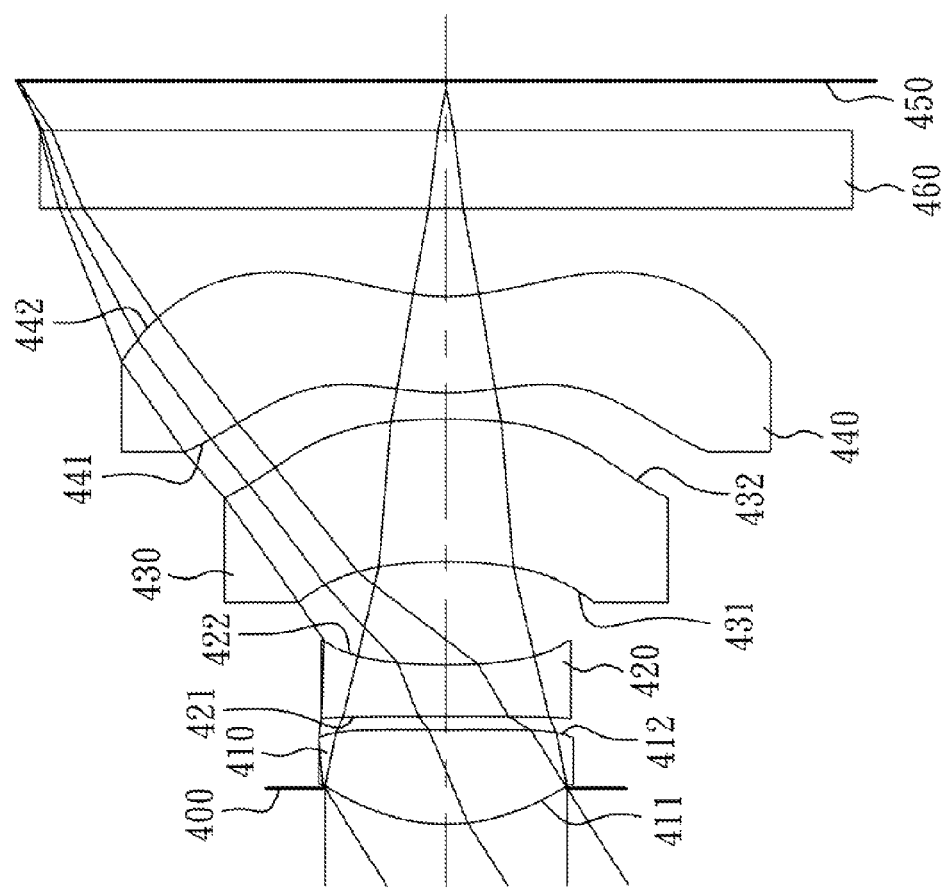
FIG. 7 is a schematic view of an image capturing optical lens assembly according to the fourth embodiment of the present disclosure.
Figure 8:
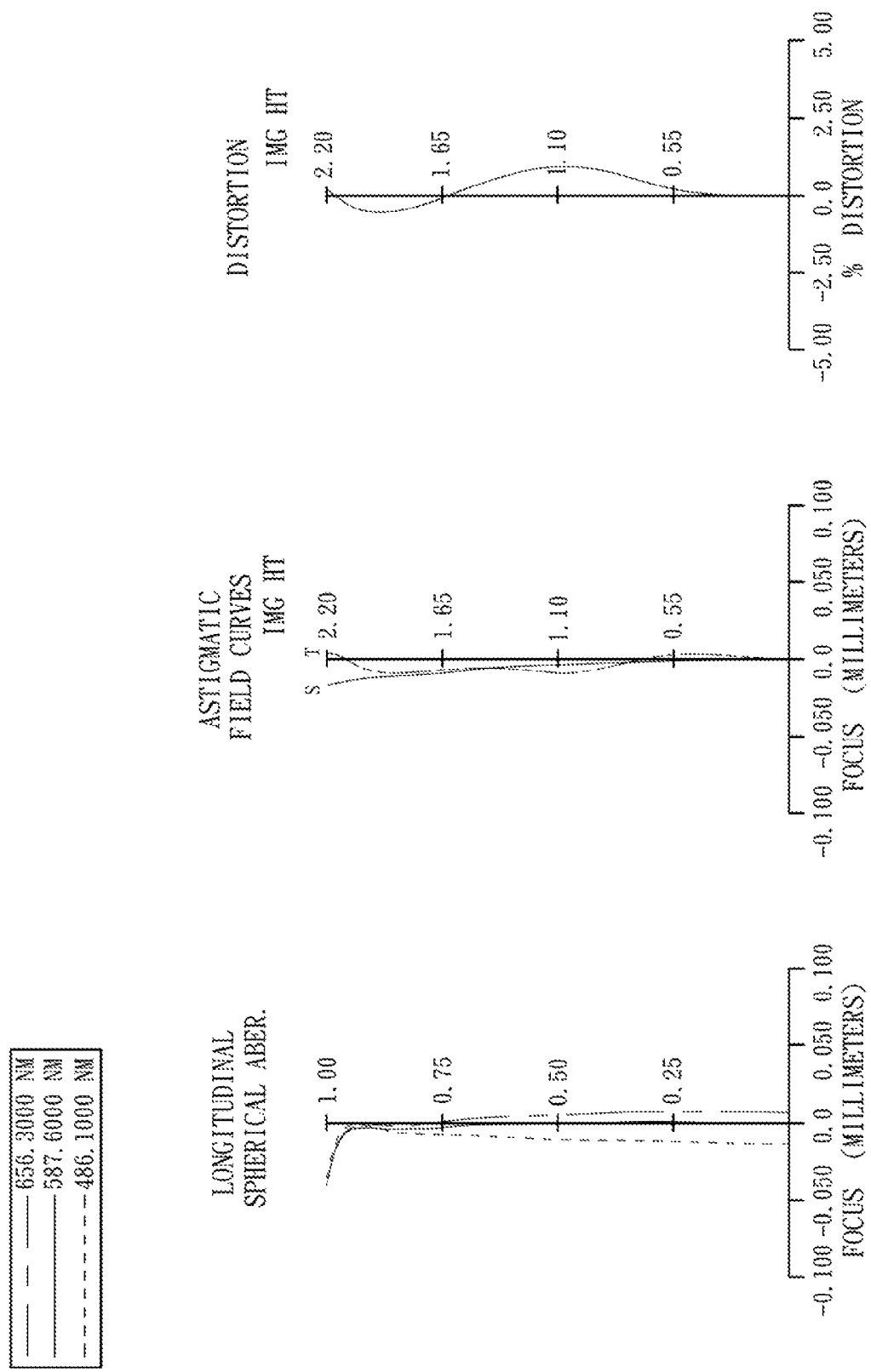
FIG. 8 shows spherical aberration curves, astigmatic field curves and a distortion curve of the image capturing optical lens assembly according to the fourth embodiment.

FIG. 7 is a schematic view of an image capturing optical lens assembly according to the fourth embodiment of the present disclosure. FIG. 8 shows spherical aberration curves, astigmatic field curves and a distortion curve of the image capturing optical lens assembly according to the fourth embodiment. In FIG. 7, the image capturing optical lens assembly includes, in order from an object side to an image side, an aperture stop 400 the first lens element 410, the second lens element 420, the third lens element 430, the fourth lens element 440, an IR (infrared) cut filter 460 and an image plane 450.

The first lens element 410 is made of plastic material. The first lens element 410 has positive refractive power and has a convex object-side surface 411 and a concave image-side surface 412. The object-side surface 411 and the image-side surface 412 of the first lens element 410 are aspheric.

The second lens element 420 is made of plastic material. The second lens element 420 has negative refractive power and, has a concave object-side surface 421 and a concave image-side surface 422. The object-side surface 421 and the image-side surface 422 of the second lens element 420 are aspheric.

The third lens element 430 is made of plastic material. The third lens element 430 has negative refractive power and has a concave object-side surface 431 and a convex image-side surface 432. The object-side surface 431 and the image-side surface 432 of the third lens element 430 are aspheric.

The fourth lens element 440 is made of plastic material. The fourth lens element 440 has negative refractive power and has a convex object-side surface 441 and a concave image-side surface 442. The object-side surface 441 and the image-side surface 442 of the fourth lens element 440 are aspheric. The fourth lens element 440 has inflection points formed on the object-side surface 441 and the image-side surface 442 thereof.

The IR cut filter 460 is made of glass and located between the fourth lens element 440 and the image plane 450, and will not affect the focal length of the image capturing optical lens assembly.

The equation of the aspheric surface profiles of the above lens elements of the fourth embodiment is the same as that of the first embodiment, and will not be stated herein again.

In the image capturing optical lens assembly according to the fourth embodiment the definitions of f, Fno, HFOV, V1, V2, V3, CT3, CT4, T12, T34, R3, R4, R5, R6, f2, f3, ImgH and TTL are the same as those stated in the first embodiment with corresponding values for the fourth embodiment. Moreover, these parameters have the following values and satisfy the following relationships:

| f (mm) | 3.47 | T34/T12 | 1.96 |
|---|---|---|---|
| Fno | 2.80 | (R3 + R4)/(R3 − R4) | 0.81 |
| HFOV (deg.) | 32.4 | (R5 − R6)/(R5 + R6) | −0.34 |
| V1-V2 | 32.5 | f2/f3 | 0.46 |
| V3-V2 | 32.5 | f/f3 | −0.37 |
| CT3/CT4 | 1.48 | TTL/ImgH | 1.67 |

The detailed optical data of the fourth embodiment are shown in Table 7 and the aspheric surface data are shown in Table 8 below.

TABLE 7

4th Embodiment
f = 3.47 mm, Fno = 2.80, HFOV = 32.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.180 | | | | |
| 2 | Lens 1 | 1.049080 (ASP) | 0.482 | Plastic | 1.544 | 55.9 | 1.98 |
| 3 | | 30.835600 (ASP) | 0.070 | | | | |
| 4 | Lens 2 | −29.053900 (ASP) | 0.260 | Plastic | 1.632 | 23.4 | −4.32 |
| 5 | | 3.021800 (ASP) | 0.529 | | | | |
| 6 | Lens 3 | −2.328450 (ASP) | 0.729 | Plastic | 1.544 | 55.9 | −9.48 |
| 7 | | −4.710500 (ASP) | 0.137 | | | | |
| 8 | Lens 4 | 1.389570 (ASP) | 0.493 | Plastic | 1.544 | 55.9 | −44.65 |
| 9 | | 1.150070 (ASP) | 0.450 | | | | |
| 10 | IR-filter | Plano | 0.400 | Glass | 1.517 | 64.2 | — |
| 11 | | Plano | 0.254 | | | | |
| 12 | Image | Plano | — | | | | |

Note:
Reference wavelength (d-line) is 587.6 nm.

TABLE 8

Aspheric Coefficients

| | Surface # | | | |
|---|---|---|---|---|
| | 2 | 3 | 4 | 5 |
| k = | −6.12604E−01 | −1.00000E+00 | −1.00000E+00 | 1.01208E+01 |
| A4 = | 5.21816E−02 | −1.25487E−01 | −1.77062E−02 | 1.54736E−01 |
| A6 = | 7.59986E−02 | −9.63337E−02 | 6.82382E−02 | 2.38064E−01 |
| A8 = | −6.94473E−01 | −5.77796E−01 | −2.00816E−01 | 1.36516E−01 |
| A10 = | 1.96333E+00 | 2.03706E+00 | 3.57463E−01 | 5.94549E−01 |
| A12 = | −2.37642E+00 | −4.59311E+00 | 1.11557E+00 | 8.80708E−01 |
| A14 = | −1.98236E+00 | 3.01863E−05 | −5.32128E+00 | 3.01598E−05 |

| | Surface # | | | |
|---|---|---|---|---|
| | 6 | 7 | 8 | 9 |
| k = | −9.96092E+00 | 8.56904E+00 | −9.15983E+00 | −5.51164E+00 |
| A4 = | −2.15987E−01 | −5.89115E−01 | −6.06262E−01 | −2.59364E−01 |
| A6 = | −1.11782E−01 | 8.15650E−01 | 3.16725E−01 | 1.37765E−01 |
| A8 = | −9.12295E−01 | −8.21883E−01 | −4.18996E−02 | −5.58302E−02 |
| A10 = | 3.02964E+00 | 3.95292E−01 | −5.35131E−03 | 1.12579E−02 |
| A12 = | −3.23305E+00 | 1.33161E−01 | −2.89722E−04 | 3.18566E−05 |
| A14 = | −1.64877E+00 | −1.78524E−01 | 1.01988E−03 | −5.85614E−04 |
| A16 = | 3.86723E+00 | 3.98864E−02 | −2.50793E−04 | 9.42212E−05 |

Figure 9:
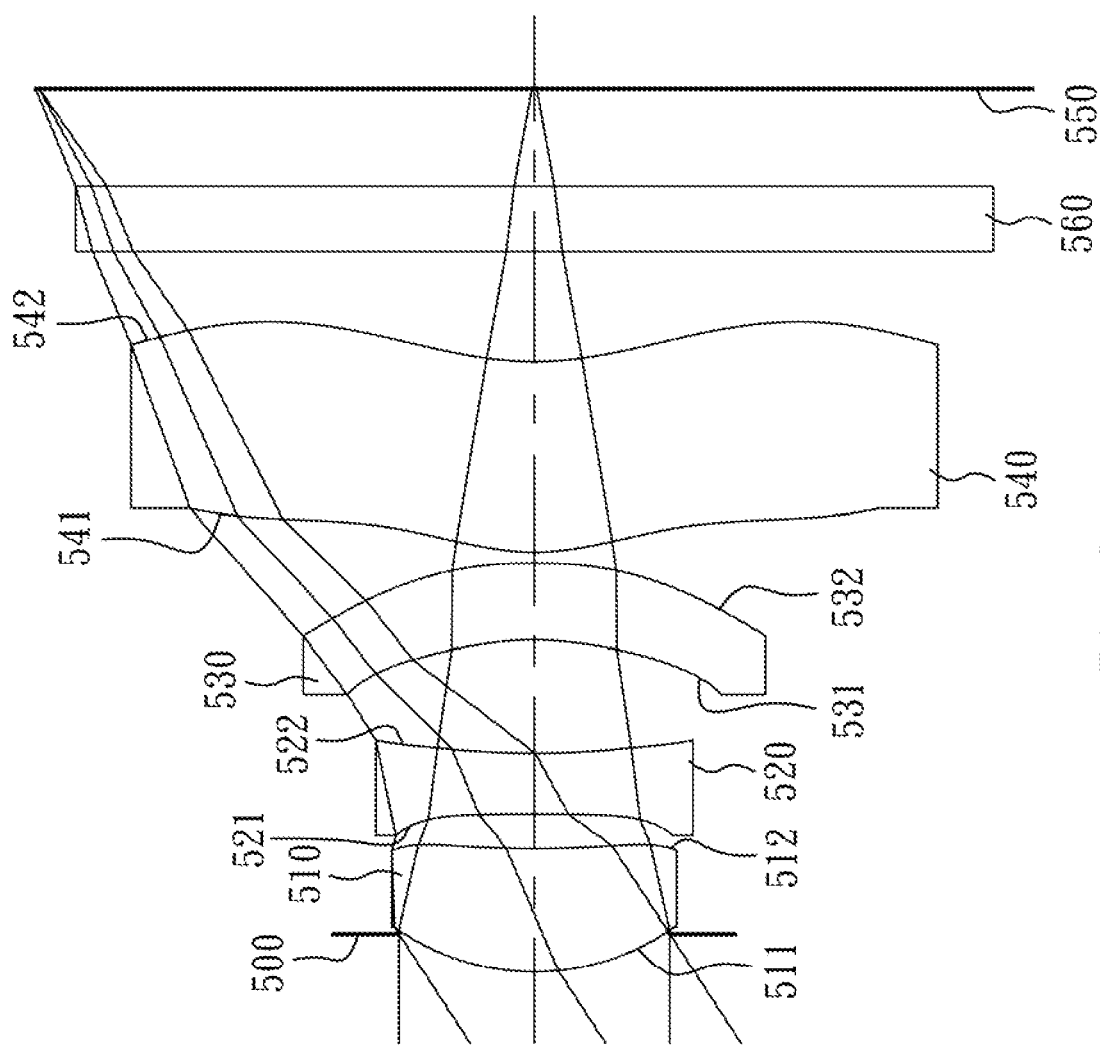
FIG. 9 is a schematic view of an image capturing optical lens assembly according to the fifth embodiment of the present disclosure.
Figure 10:
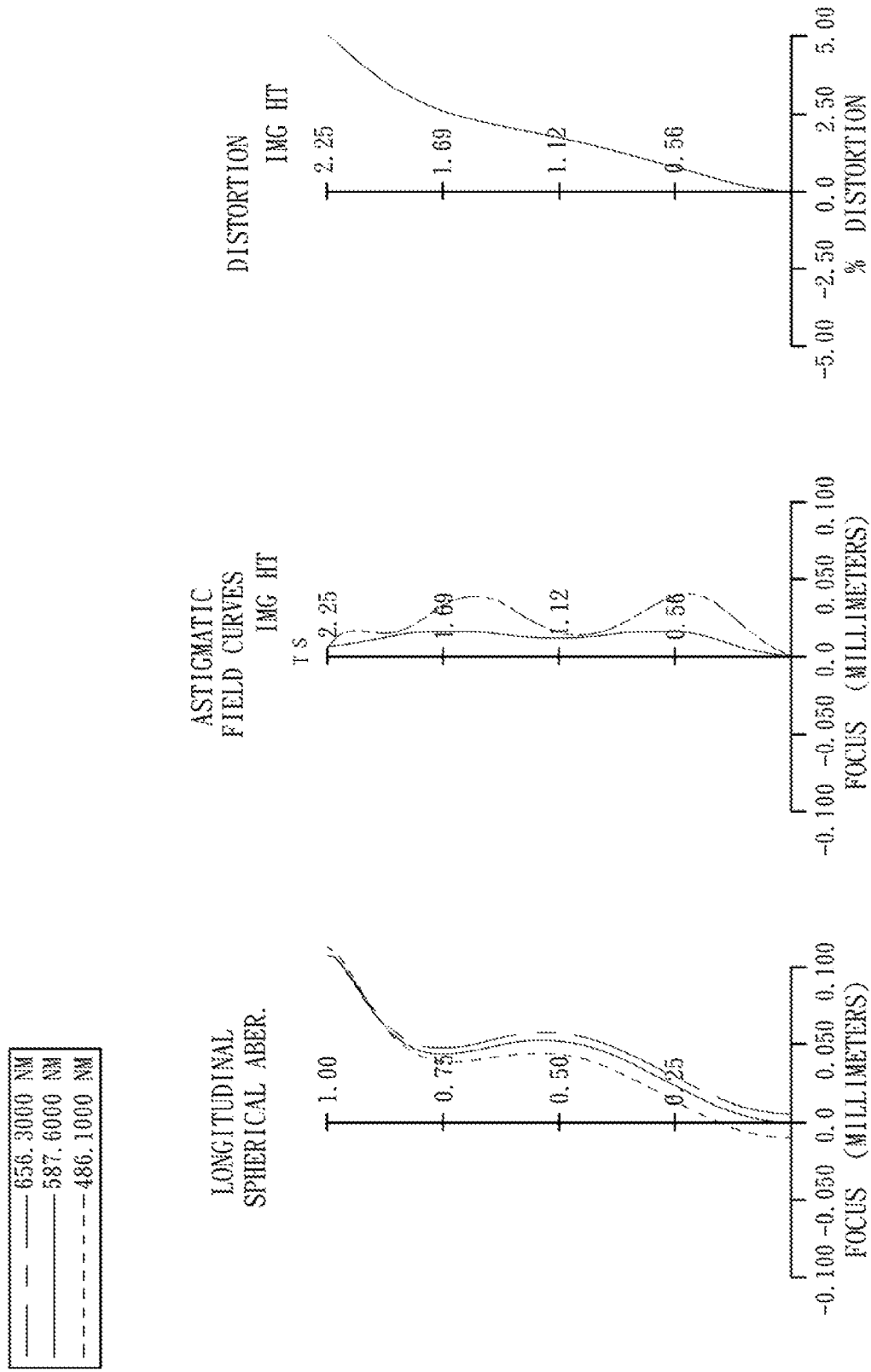
FIG. 10 shows spherical aberration curves, astigmatic field curves and a distortion curve of the image capturing optical lens assembly according to the fifth embodiment.

FIG. 9 is a schematic view of an image capturing optical lens assembly according to the fifth embodiment of the present disclosure. FIG. 10 shows spherical aberration curves, astigmatic field curves and a distortion curve of the image capturing optical lens assembly according to the fifth embodiment. In FIG. 9, the image capturing optical lens assembly includes, in order from an object side to an image side, an aperture stop 500, the first lens element 510, the second lens element 520, the third lens element 530, the fourth lens element 540, an IR (infrared) cut filter 560 and an image plane 550.

The first lens element 510 is made of plastic material. The first lens element 510 has positive refractive power and has a convex object-side surface 511 and a concave image-side surface 512. The object-side surface 511 and the image-side surface 512 of the first lens element 510 are aspheric.

The second lens element 520 is made of plastic material. The second lens element 520 has negative refractive power and has a concave object-side surface 521 and a concave image-side surface 522. The object-side surface 521 and the image-side surface 522 of the second lens element 520 are aspheric.

The third lens element 530 is made of plastic material. The third lens element 530 has negative refractive power and has a concave object-side surface 531 and a convex image-side surface 532. The object-side surface 531 and the image-side surface 532 of the third lens element 530 are aspheric.

The fourth lens element 540 is made of plastic material. The fourth lens element 540 has positive refractive power and has a convex object-side surface 541 and a concave image-side surface 542. The object-side surface 541 and the image-side surface 542 of the fourth lens element 540 are aspheric. The fourth lens element 540 has inflection points formed on the object-side surface 541 and the image-side surface 542 thereof.

The IR cut filter 560 is made of glass and located between the fourth lens element 540 and the image plane 550, and will not affect the focal length of the image capturing optical lens assembly.

The equation of the aspheric surface profiles of the above lens elements of the fifth embodiment is the same as that of the first embodiment, and will not be stated herein again.

In the image capturing optical lens assembly according to the fifth embodiment the definitions of f, Fno, HFOV, V1, V2, V3, CT3, CT4, T12, T34, R3, R4, R5, R6, f2, f3, ImgH and TTL are the same as those stated in the first embodiment with corresponding values for the fifth embodiment. Moreover, these parameters have the following values and satisfy the following relationships:

| | | | |
|---|---|---|---|
| f (mm) | 3.26 | T34/T12 | 0.31 |
| Fno | 2.65 | (R3 + R4)/(R3 − R4) | 0.69 |
| HFOV (deg.) | 33.0 | (R5 − R6)/(R5 + R6) | −0.33 |
| V1-V2 | 32.0 | f2/f3 | 1.10 |
| V3-V2 | 6.4 | f/f3 | −0.69 |
| CT3/CT4 | 0.40 | TTL/ImgH | 1.74 |

The detailed optical data of the fifth embodiment are shown in Table 9 and the aspheric surface data are shown in Table 10 below.

TABLE 9

5th Embodiment
f = 3.26 mm, Fno = 2.65, HFOV = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.173 | | | | |
| 2 | Lens 1 | 1.110950 (ASP) | 0.559 | Plastic | 1.530 | 55.8 | 2.60 |
| 3 | | 4.761900 (ASP) | 0.159 | | | | |
| 4 | Lens 2 | −21.276600 (ASP) | 0.274 | Plastic | 1.634 | 23.8 | −5.22 |
| 5 | | 3.939500 (ASP) | 0.518 | | | | |
| 6 | Lens 3 | −1.240350 (ASP) | 0.348 | Plastic | 1.583 | 30.2 | −4.75 |
| 7 | | −2.479350 (ASP) | 0.050 | | | | |
| 8 | Lens 4 | 0.985550 (ASP) | 0.866 | Plastic | 1.530 | 55.8 | 3.40 |
| 9 | | 1.513870 (ASP) | 0.500 | | | | |
| 10 | IR-filter | Plano | 0.300 | Glass | 1.517 | 64.2 | — |
| 11 | | Plano | 0.440 | | | | |
| 12 | Image | Plano | — | | | | |

Note:
Reference wavelength (d-line) is 587.6 nm

TABLE 10

Aspheric Coefficients

| | Surface # | | | |
|---|---|---|---|---|
| | 2 | 3 | 4 | 5 |
| k = | −5.71015E−01 | 2.44971E+01 | −1.00000E+00 | 6.11220E+00 |
| A4 = | 5.64880E−02 | −4.94792E−03 | −1.46219E−01 | 6.12581E−02 |
| A6 = | 1.92404E−01 | −8.28671E−01 | −1.09210E+00 | −6.30114E−01 |
| A8 = | −1.78988E−01 | 1.46467E+00 | 1.65675E+00 | 1.06303E+00 |
| A10 = | −9.77720E−02 | −3.52170E+00 | −4.08563E+00 | −8.49763E−01 |
| A12 = | 2.45215E−08 | −1.90835E−07 | 9.14555E−08 | 8.22213E−01 |

| | Surface # | | | |
|---|---|---|---|---|
| | 6 | 7 | 8 | 9 |
| k = | −1.48592E+01 | 3.43500E+00 | −8.25452E+00 | −2.21152E+00 |
| A4 = | −2.49725E−02 | −2.96800E−01 | −2.21896E−01 | −1.88384E−01 |
| A6 = | −2.24217E−01 | 4.80275E−01 | 1.40494E−01 | 8.34276E−02 |
| A8 = | 1.79194E−01 | −3.21904E−01 | −3.72843E−02 | −2.68082E−02 |
| A10 = | −8.99877E−03 | 7.28975E−02 | 3.81633E−03 | 5.23350E−03 |
| A12 = | −2.85774E−01 | 2.69903E−02 | 1.72255E−04 | −4.42651E−04 |
| A14 = | | | −5.06490E−05 | 3.92919E−06 |

Figure 11:
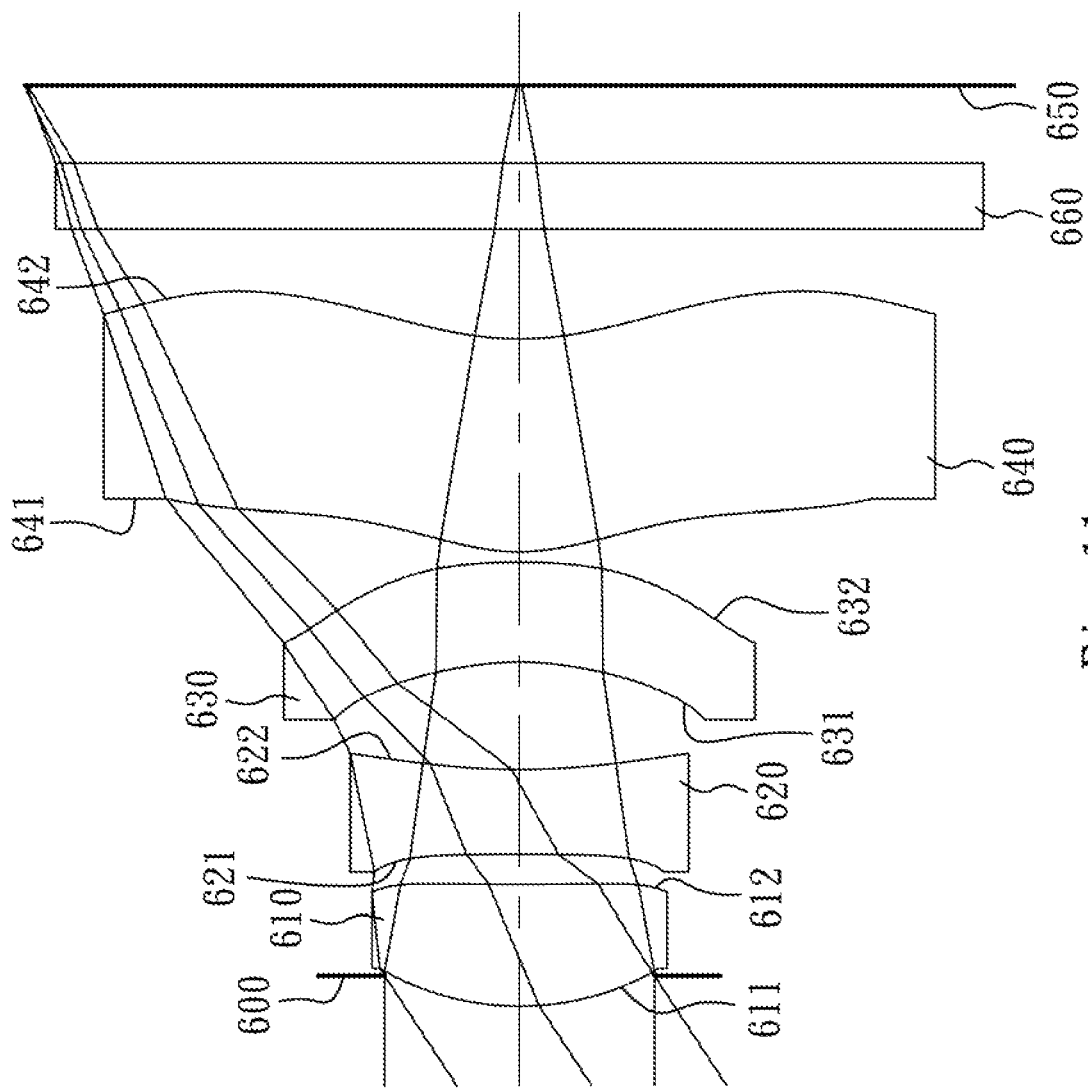
FIG. 11 is a schematic view of an age capturing optical lens assembly according to the sixth embodiment of the present disclosure.
Figure 12:
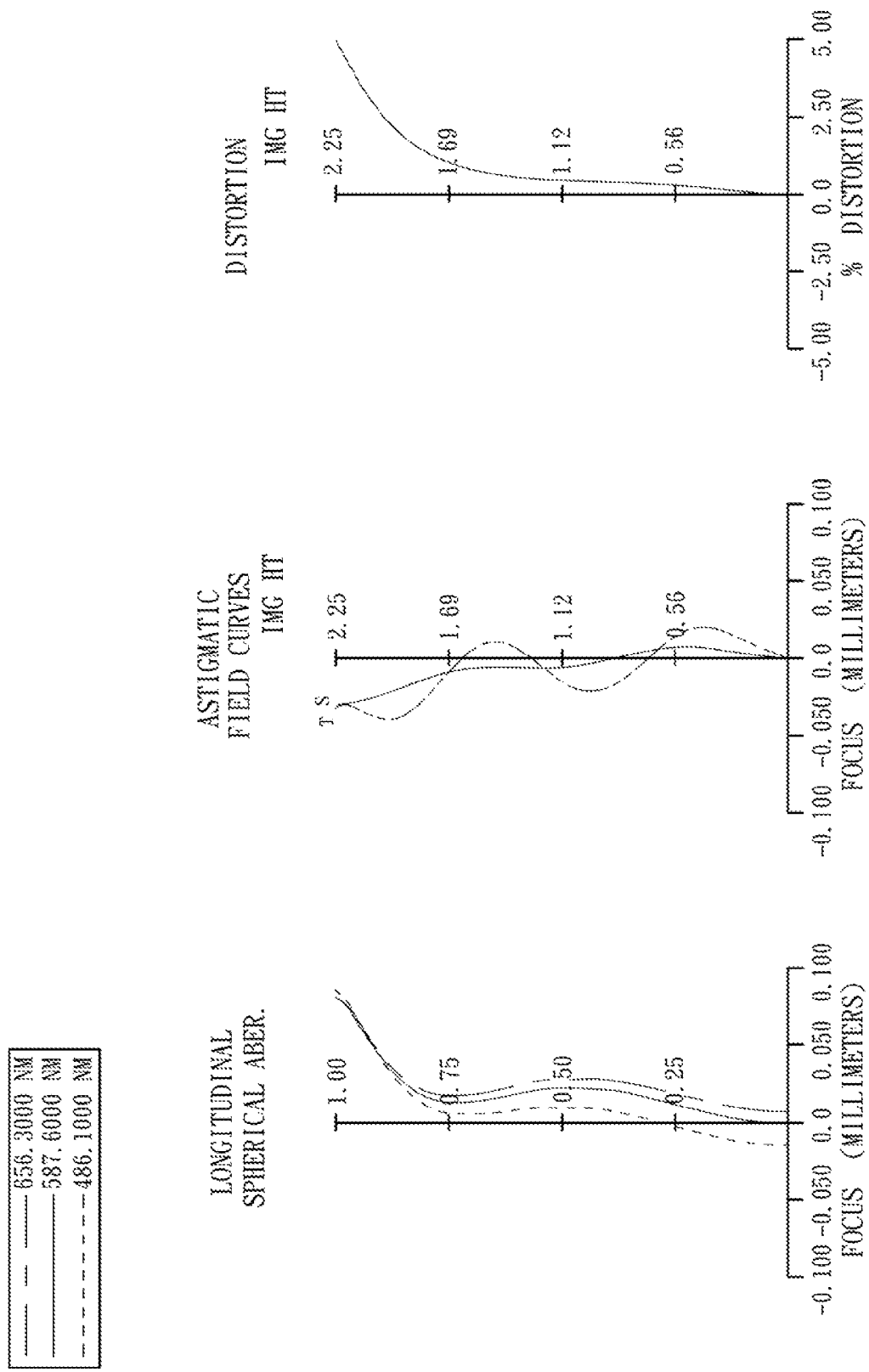
FIG. 12 shows spherical aberration curves, astigmatic field curves and a distortion curve of the image capturing optical lens assembly according to the sixth embodiment.

FIG. 11 is a schematic view of an image capturing optical lens assembly according to the sixth embodiment of the present disclosure. FIG. 12 shows spherical aberration curves, astigmatic field curves and a distortion curve of the image capturing optical lens assembly according to the sixth embodiment. In FIG. 11, the image capturing optical lens assembly includes, in order from an object side to an image side, an aperture stop 600, the first lens element 610, the second lens element 620, the third lens element 630, the fourth lens element 640, an IR (infrared) cut filter 660 and an image plane 650.

The first lens element 610 is made of plastic material. The first lens element 610 has positive refractive power and has a convex object-side surface 611 and a concave image-side surface 612. The object-side surface 611 and the image-side surface 612 of the first lens element 610 are aspheric.

The second lens element 620 is made of plastic material. The second lens element 620 has negative refractive power and has a concave object-side surface 621 and a concave image-side surface 622. The object-side surface 621 and the image-side surface 622 of the second lens element 620 are aspheric.

The third lens element 630 is made of plastic material. The third lens element 630 has negative refractive power and has a concave object-side surface 631 and a convex image-side surface 632. The object-side surface 631 and the image-side surface 632 of the third lens element 630 are aspheric.

The fourth lens element 640 is made of plastic material. The fourth lens element 640 has positive refractive power and has a convex object-side surface 641 and a concave image-side surface 642. The object-side surface 641 and the image-side surface 642 of the fourth lens element 640 are aspheric. The fourth lens element 640 has inflection points formed on the object-side surface 641 and the image-side surface 642 thereof.

The IR cut filter 660 is made of glass and located between the fourth lens element 640 and the image plane 650, and will not affect the focal length of the image capturing optical lens assembly.

The equation of the aspheric surface profiles of the above lens elements of the sixth embodiment is the same as that of the first embodiment, and will not be stated herein again.

In the image capturing optical lens assembly according to the sixth embodiment the definitions of f, Fno, HFOV, V1, V2, V3, CT3, CT4, T12, T34, R3, R4, R5, R6, f2, f3, ImgH and TTL are the same as those stated in the first embodiment with corresponding values for the sixth embodiment. Moreover, these parameters have the following values and satisfy the following relationships:

| f (mm) | 3.25 | T34/T12 | 0.36 |
| Fno | 2.65 | (R3 + R4)/(R3 − R4) | 0.63 |
| HFOV (deg.) | 33.3 | (R5 − R6)/(R5 + R6) | −0.45 |
| V1-V2 | 32.5 | f2/f3 | 1.23 |
| V3-V2 | 32.7 | f/f3 | −0.84 |
| CT3/CT4 | 0.47 | TTL/ImgH | 1.82 |

The detailed optical data of the sixth embodiment are shown in Table 11 and the aspheric surface data are shown in Table 12 below.

TABLE 11

6th Embodiment
f = 3.25 mm, Fno = 2.65, HFOV = 33.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.139 | | | | |
| 2 | Lens 1 | 1.271630 (ASP) | 0.554 | Plastic | 1.535 | 56.3 | 2.51 |
| 3 | | 20.000000 (ASP) | 0.137 | | | | |
| 4 | Lens 2 | −16.482800 (ASP) | 0.386 | Plastic | 1.634 | 23.8 | −4.77 |
| 5 | | 3.733200 (ASP) | 0.492 | | | | |
| 6 | Lens 3 | −1.205760 (ASP) | 0.450 | Plastic | 1.543 | 56.5 | −3.87 |
| 7 | | −3.201800 (ASP) | 0.050 | | | | |
| 8 | Lens 4 | 0.902850 (ASP) | 0.966 | Plastic | 1.530 | 55.8 | 2.87 |
| 9 | | 1.399050 (ASP) | 0.500 | | | | |
| 10 | IR-filter | Plano | 0.300 | Glass | 1.517 | 64.2 | — |
| 11 | | Plano | 0.352 | | | | |
| 12 | Image | Plano | — | | | | |

Note:
Reference wavelength (d-line) is 587.6 nm.

TABLE 12

Aspheric Coefficients

| | Surface # | | | |
|---|---|---|---|---|
| | 2 | 3 | 4 | 5 |
| k = | −6.42522E−01 | 5.00000E+01 | −1.00000E+00 | 1.00965E+01 |
| A4 = | 3.93817E−02 | 3.81559E−02 | −1.75537E−02 | 9.98880E−02 |
| A6 = | 1.47946E−01 | −6.85904E−01 | −9.55982E−01 | −5.90993E−01 |
| A8 = | −1.60916E−01 | 1.31517E+00 | 1.74609E+00 | 1.03308E+00 |
| A10 = | −2.19531E−01 | −2.51584E+00 | −3.05078E+00 | −1.21029E+00 |
| A12 = | 2.39237E−08 | −1.33191E−07 | 5.96448E−08 | 6.88550E−01 |

TABLE 12-continued

Aspheric Coefficients

| Surface # | | | |
|---|---|---|---|
| 6 | 7 | 8 | 9 |
| k = −1.61448E+01 | 6.50165E+00 | −6.50611E+00 | −2.07285E+00 |
| A4 = −1.00970E−01 | −4.35899E−01 | −2.21652E−01 | −1.86338E−01 |
| A6 = −2.44960E−01 | 5.05802E−01 | 1.36078E−01 | 8.34935E−02 |
| A8 = 2.43533E−01 | −3.02678E−01 | −3.66538E−02 | −2.73468E−02 |
| A10 = 4.69268E−02 | 7.74137E−02 | 3.96467E−03 | 5.26591E−03 |
| A12 = −3.66392E−01 | 2.98614E−02 | 1.72251E−04 | −4.33521E−04 |
| A14 = | | −5.58902E−05 | 4.77098E−06 |

Figure 13:
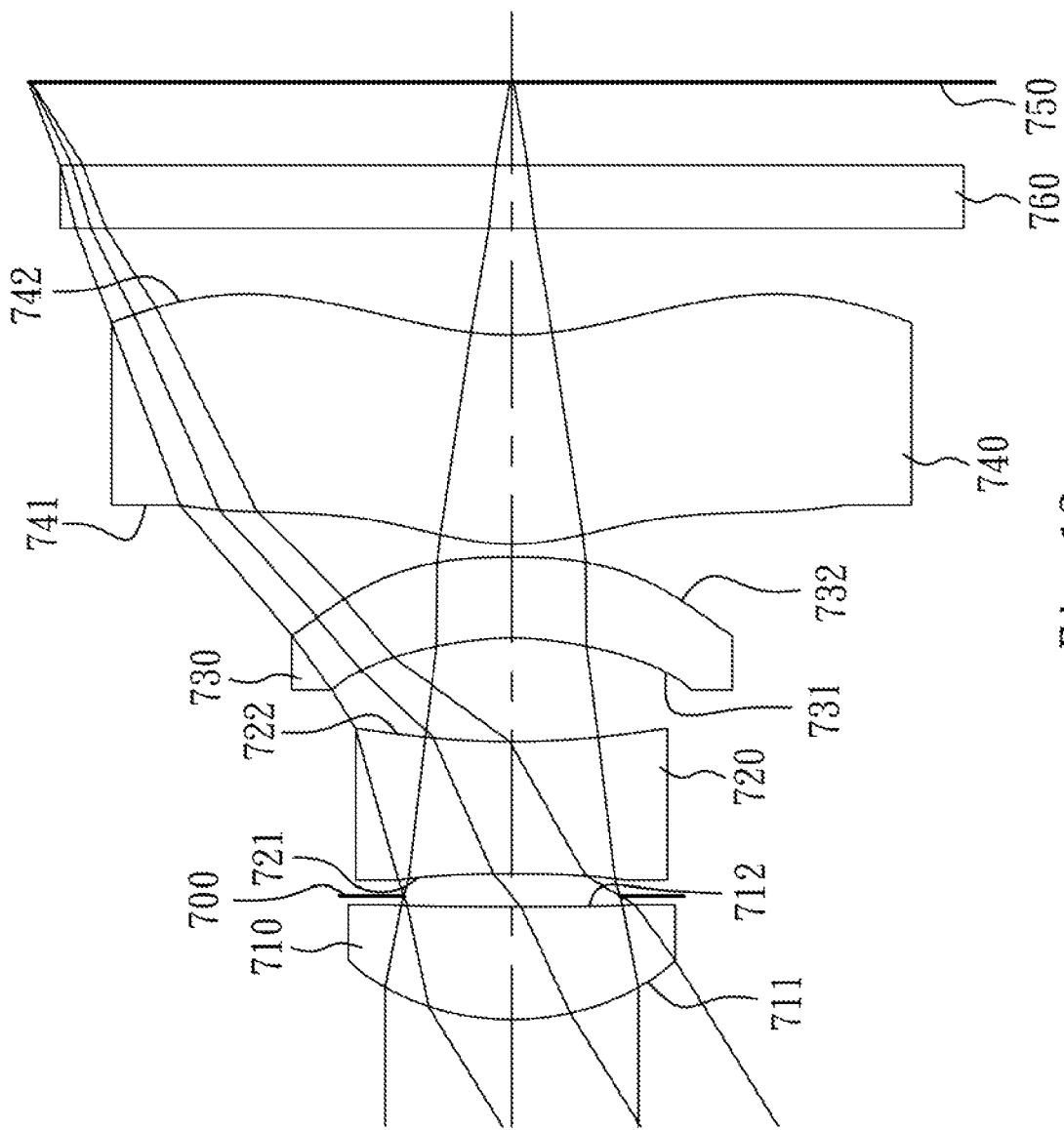
FIG. 13 is a schematic view of an image capturing optical lens assembly according to the seventh embodiment of the present disclosure.
Figure 14:
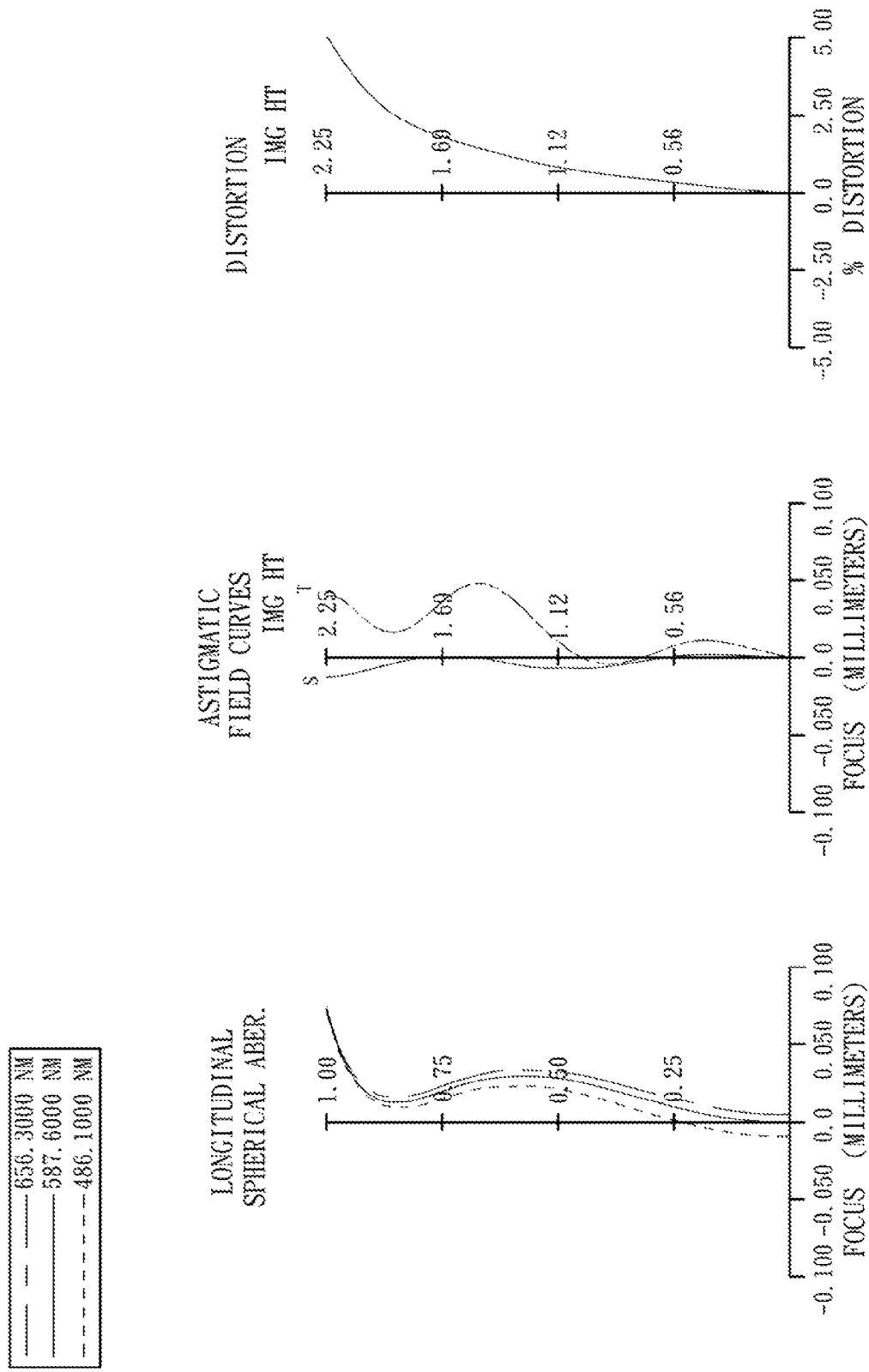
FIG. 14 shows spherical aberration curves, astigmatic field curves and a distortion curve of the image capturing optical lens assembly according to the seventh embodiment.

FIG. 13 is a schematic view of an image capturing optical lens assembly according to the seventh embodiment of the present disclosure. FIG. 14 shows spherical aberration curves, astigmatic field curves and a distortion curve of the image capturing optical lens assembly according to the seventh embodiment. In FIG. 13, the image capturing optical lens assembly includes, in order from an object side to an image side, the first lens element 710, an aperture stop 700, the second lens element 720, the third lens element 730, the fourth lens element 740, an IR (infrared) cut filter 760 and an image plane 750.

The first lens element 710 is made of plastic material. The first lens element 710 has positive refractive power and has a convex object-side surface 711 and a concave image-side surface 712. The object-side surface 711 and the image-side surface 712 of the first lens element 710 are aspheric.

The second lens element 720 is made of plastic material. The second lens element 720 has negative refractive power and has a concave object-side surface 721 and a concave image-side surface 722. The object-side surface 721 and the image-side surface 722 of the second lens element 720 are aspheric.

The third lens element 730 is made of plastic material. The third lens element 730 has negative refractive power and has a concave object-side surface 731 and a convex image-side surface 732. The object-side surface 731 and the image-side surface 732 of the third lens element 730 are aspheric.

The fourth lens element 740 is made of plastic material. The fourth lens element 740 has positive refractive power and has a convex object-side surface 741 and a concave image-side surface 742. The object-side surface 741 and the image-side surface 742 of the fourth lens element 740 are aspheric. The fourth lens element 740 has inflection points formed on the object-side surface 741 and the image-side surface 742 thereof.

The IR cut filter 760 is made of glass and located between the fourth lens element 740 and the image plane 750, and will not affect the focal length of the image capturing optical lens assembly.

The equation of the aspheric surface profiles of the above lens elements of the seventh embodiment is the same as that of the first embodiment, and will not be stated herein again.

In the image capturing optical lens assembly according to the seventh embodiment the definitions of f, Fno, HFOV, V1, V2, V3, CT3, CT4, T12 T34, R3, R4, R5, R6, f2, f3, ImgH and TTL are the same as those stated in the first embodiment with corresponding values for the seventh embodiment. Moreover, these parameters have the following values and satisfy the following relationships:

| f (mm) | 3.44 | T34/T12 | 0.40 |
|---|---|---|---|
| Fno | 2.90 | (R3 + R4)/(R3 − R4) | 0.11 |
| HFOV (deg.) | 31.8 | (R5 − R6)/(R5 + R6) | −0.43 |
| V1-V2 | 32.5 | f2/f3 | 0.96 |
| V3-V2 | 32.7 | f/f3 | −0.82 |
| CT3/CT4 | 0.38 | TTL/ImgH | 1.91 |

The detailed optical data of the seventh embodiment are shown in Table 13 and the aspheric surface data are shown in Table 14 below.

TABLE 13

7th Embodiment
f = 3.44 mm, Fno = 2.90, HFOV = 31.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.300600 (ASP) | 0.531 | Plastic | 1.535 | 56.3 | 2.47 |
| 2 | | 80.321300 (ASP) | 0.050 | | | | |
| 3 | Ape. Stop | Plano | 0.101 | | | | |
| 4 | Lens 2 | −5.843200 (ASP) | 0.622 | Plastic | 1.634 | 23.8 | −4.02 |
| 5 | | 4.710500 (ASP) | 0.486 | | | | |
| 6 | Lens 3 | −1.263170 (ASP) | 0.377 | Plastic | 1.543 | 56.5 | −4.18 |
| 7 | | −3.145900 (ASP) | 0.060 | | | | |
| 8 | Lens 4 | 0.952700 (ASP) | 0.981 | Plastic | 1.530 | 55.8 | 2.97 |
| 9 | | 1.549380 (ASP) | 0.500 | | | | |
| 10 | IR-filter | Plano | 0.300 | Glass | 1.517 | 64.2 | — |
| 11 | | Plano | 0.383 | | | | |
| 12 | Image | Plano | — | | | | |

Note:
Reference wavelength (d-line) is 587.6 nm

TABLE 14

| Aspheric Coefficients | | | | |
|---|---|---|---|---|
| | Surface # | | | |
| | 1 | 2 | 4 | 5 |
| k = | −4.26925E−01 | 4.70317E+01 | −1.00000E+00 | 1.93452E+01 |
| A4 = | 5.55745E−02 | 1.21300E−01 | 2.86512E−02 | 1.20609E−01 |
| A6 = | 9.39548E−02 | −2.87574E−01 | −4.74592E−01 | −5.15074E−01 |
| A8 = | 1.61305E−02 | 4.56422E−01 | 1.20302E+00 | 1.00134E+00 |
| A10 = | −7.99044E−03 | −4.70604E−01 | −2.75465E+00 | −1.25219E+00 |
| A12 = | −5.46487E−06 | −3.90501E−06 | −3.72229E−06 | 5.55177E−01 |
| | Surface # | | | |
| | 6 | 7 | 8 | 9 |
| k = | −2.00000E+01 | 5.45672E+00 | −7.86042E+00 | −1.76361E+00 |
| A4 = | −1.19805E−01 | −4.35941E−01 | −2.22047E−01 | −1.88592E−01 |
| A6 = | −1.99081E−01 | 4.90531E−01 | 1.36854E−01 | 8.31198E−02 |
| A8 = | 2.44442E−01 | −3.12017E−01 | −3.65796E−02 | −2.74184E−02 |
| A10 = | 5.70210E−03 | 7.97899E−02 | 3.92287E−03 | 5.24711E−03 |
| A12 = | −3.23580E−01 | 3.36807E−02 | 1.67532E−04 | −4.35283E−04 |
| A14 = | | | −5.55869E−05 | 6.44836E−06 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing optical lens assembly comprising, in order from an object side to an image side:
    a first lens element with positive refractive power having a convex object-side surface and a concave image-side surface;
    a second lens element with negative refractive power;
    a third lens element with negative refractive power having a concave object-side surface and a convex image-side surface; and
    a fourth lens element with refractive power having a convex object-side surface and a concave image-side surface, wherein the object-side surface and the image-side surface of the fourth lens element are aspheric, and the fourth lens element has at least one inflection point formed on at least one of the object-side surface and the image-side surface thereof;
    wherein a focal length of the image capturing optical lens assembly is f, a focal length of the third lens element is f3, an axial distance between the first lens element and the second lens element is T12, an axial distance between the third lens element and the fourth lens element is T34, the Abbe number of the second lens element is V2, the Abbe number of the third lens element is V3, and the following relationships are satisfied:

$-1.2 < f/f3 < -0.3;$ $0 < T34/T12 < 2.1;$ and $23 < V3 - V2 < 42.$

2. The image capturing optical lens assembly of claim 1, wherein the axial distance between the first lens element and the second lens element is T12, the axial distance between the third lens element and the fourth lens element is T34, and the following relationship is satisfied:

$0 < T34/T12 < 1.0.$

3. The image capturing optical lens assembly of claim 1, wherein a focal length of the second lens element is f2, the focal length of the third lens element is f3, and the following relationship is satisfied:

$0.7 < f2/f3 < 1.3.$

4. The image capturing optical lens assembly of claim 1, wherein a central thickness of the third lens element is CT3, a central thickness of the fourth lens element is CT4, and the following relationship is satisfied:

$0.25 < CT3/CT4 < 0.6.$

5. The image capturing optical lens assembly of claim 1, wherein the focal length of the image capturing optical lens assembly is f, the focal length of the third lens element is f3, and the following relationship is satisfied:

$-1.0 < f/f3 < -0.5.$

6. The image capturing optical lens assembly of claim 1, further comprising:
    an image sensor located on an image plane, wherein a half of a diagonal length of an effective photosensitive area of the image sensor is ImgH, the axial distance between the object-side surface of the first lens element and the image plane is TTL, and the following relationship is satisfied:

$TTL/ImgH < 2.0.$

7. The image capturing optical lens assembly of claim 1, wherein the fourth lens element has positive refractive power.

8. The image capturing optical lens assembly of claim 1, wherein a curvature radius of the object-side surface of the third lens element is R5, a curvature radius of the image-side surface of the third lens element is R6, and the following relationship is satisfied:

$-0.5 < (R5 - R6)/(R5 + R6) < -0.2.$

9. The image capturing optical lens assembly of claim 1, wherein the Abbe number of the first lens element is V1, the Abbe number of the second lens element is V2, and the following relationship is satisfied:

$30 < V1 - V2 < 45.$

* * * * *